(12) United States Patent
Waggoner

(10) Patent No.: US 12,206,874 B1
(45) Date of Patent: Jan. 21, 2025

(54) SPATIALLY LAPPED ENCODING

(71) Applicant: Amazon Technologies, Inc., Seattle, WA (US)

(72) Inventor: Charles Benjamin Waggoner, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 218 days.

(21) Appl. No.: 17/809,180

(22) Filed: Jun. 27, 2022

(51) Int. Cl.
- *H04N 19/33* (2014.01)
- *H04N 19/172* (2014.01)
- *H04N 19/182* (2014.01)
- *H04N 19/88* (2014.01)

(52) U.S. Cl.
CPC ........... *H04N 19/33* (2014.11); *H04N 19/172* (2014.11); *H04N 19/182* (2014.11); *H04N 19/88* (2014.11)

(58) Field of Classification Search
None
See application file for complete search history.

(56) References Cited

U.S. PATENT DOCUMENTS

| | | | |
|---|---|---|---|
| 8,908,775 B1 | 12/2014 | Higa | |
| 9,607,015 B2 * | 3/2017 | Gao | G06F 16/78 |
| 9,621,905 B2 | 4/2017 | Coban et al. | |
| 10,042,660 B2 | 8/2018 | Wagner et al. | |
| 10,051,270 B2 * | 8/2018 | Kitahara | H04N 19/176 |
| 10,880,585 B1 | 12/2020 | Waggoner et al. | |
| 11,743,461 B2 * | 8/2023 | Guo | H04L 65/75 |
| | | | 375/240.02 |
| 11,869,240 B1 | 1/2024 | Patluri et al. | |
| 2006/0269116 A1 * | 11/2006 | Makarovic | G03F 7/70508 |
| | | | 382/141 |
| 2009/0310817 A1 * | 12/2009 | Park | H04N 5/913 |
| | | | 382/100 |
| 2010/0329348 A1 * | 12/2010 | Orchard | H04N 19/61 |
| | | | 375/E7.125 |

(Continued)

OTHER PUBLICATIONS

"1080p", Wikipedia [Retrieved from "https://en.wikipedia.org/w/index.php?title=1080p&oldid=1126997623"], 7 pages.

(Continued)

*Primary Examiner* — Mohammad J Rahman
(74) *Attorney, Agent, or Firm* — Weaver Austin Villeneuve & Sampson LLP

(57) ABSTRACT

Methods and apparatus are described for high-resolution video encoding using spatial lapping to reduce visual discontinuities within video frames. A plurality of frame regions may be encoded to form a higher-resolution video frame. For example, a 7680×4320 video frame may be constructed from four 4096×2160 frame regions arranged into a 2×2 grid. The encoding of the frame regions may be done in parallel. The encoded frame regions may be arranged such that the frame regions lap one another at one or more overlapping regions. Encoding of border regions adjacent to the overlapping regions may be done based on an encoding parameter (e.g., quantization parameter) of pixels of an overlapping region to determine an encoding parameter of pixels of the border regions to reduce visual artifacts at seams between frame regions and overlapping regions.

20 Claims, 20 Drawing Sheets

(56) References Cited

U.S. PATENT DOCUMENTS

| | | | | |
|---|---|---|---|---|
| 2012/0213449 | A1* | 8/2012 | Samuelsson | H04N 19/105 |
| | | | | 382/238 |
| 2014/0003531 | A1 | 1/2014 | Coban et al. | |
| 2014/0269919 | A1* | 9/2014 | Rodriguez | H04N 19/40 |
| | | | | 375/240.16 |
| 2015/0177606 | A1* | 6/2015 | Ito | G03B 21/13 |
| | | | | 353/30 |
| 2015/0221105 | A1* | 8/2015 | Tripathi | A61B 5/0077 |
| | | | | 382/131 |
| 2016/0173769 | A1* | 6/2016 | Campbell | H04N 19/12 |
| | | | | 348/222.1 |
| 2018/0157915 | A1* | 6/2018 | Sherry | H04N 21/84 |
| 2018/0197552 | A1* | 7/2018 | Fuchs | G10L 25/18 |
| 2018/0342252 | A1* | 11/2018 | Fuchs | G10L 25/18 |
| 2018/0352245 | A1 | 12/2018 | Macdonald et al. | |
| 2019/0228786 | A1* | 7/2019 | Fuchs | G10L 19/02 |
| 2019/0349626 | A1* | 11/2019 | Gupta | H04N 21/4316 |
| 2021/0312217 | A1* | 10/2021 | Nater | G06K 7/1408 |
| 2021/0397297 | A1* | 12/2021 | Ding | G06F 3/0443 |
| 2022/0036629 | A1* | 2/2022 | Tuomi | G06F 9/3877 |
| 2022/0084166 | A1* | 3/2022 | Navarrete Michelini | |
| | | | | G06N 3/048 |
| 2022/0262121 | A1* | 8/2022 | Iqbal | G06V 40/20 |
| 2022/0400300 | A1* | 12/2022 | Blythe | H04N 21/23418 |
| 2023/0100413 | A1* | 3/2023 | Zhu | G06T 9/002 |
| | | | | 375/240.18 |
| 2023/0169759 | A1* | 6/2023 | Kandpal | G06V 10/761 |
| | | | | 382/159 |
| 2024/0061569 | A1* | 2/2024 | Chen | G06F 1/3265 |

OTHER PUBLICATIONS

"21:9 aspect ratio", Wikipedia [Retrieved from "https://en.wikipedia.org/w/index.php?title=21:9_aspect_ratio&oldid=1129396952"], 8 pages.

"4K resolution", Wikipedia [Retrieved from "https://en.wikipedia.org/w/index.php?title=4K_resolution&oldid=1128492782"], 20 pages.

"8K resolution", Wikipedia [Retrieved from "https://en.wikipedia.org/w/index.php?title=8K_resolution&oldid=1123674344"], 11 pages.

"Aspect ratio (image)", Wikipedia [Retrieved from "https://en.wikipedia.org/w/index.php?title=Aspect_ratio_(image)&oldid=1129766986"], 14 pages.

Core, J., "2160p vs. 4k: Why is it Called 4K Instead of 2160p?", Projector Ninja, 6 pages.

Hassan, K.H. et al., "Motion Estimation in HEVC/H.265: Metaheuristic Approach to Improve the Efficiency", Engineering Proceedings, 2021, vol. 12, No. 59, 4 Pages.

"High Efficiency Video Coding tiers and levels", Wikipedia [Retrieved from "https://en.wikipedia.org/w/index.php?title=High_Efficiency_Video_Coding_tiers_and_levels&oldid=1098120425"], 3 pages.

"List of common resolutions", Wikipedia [Retrieved from "https://en.wikipedia.org/w/index.php?title=List_of_common_resolutions&oldid=1126997667"], 15 pages.

Robitza, W., "Understanding Rate Control Modes (x264, x265, vpx)", Mar. 1, 2017, 13 pages.

Schierl, T. et al., "Wavefronts for HEVC Parallelism", Fraunhofer Institute for Telecommunications, Heinrich Hertz Institute, HHI, 2 pages.

"Ultrawide formats", Wikipedia [Retrieved from "https://en.wikipedia.org/w/index.php?title=Ultrawide_formats&oldid=1117482803"], 8 pages.

Vanam, R., "Motion Estimation and Intra Frame Prediction in H.264/AVC Encoder", University of Washington, 31 pages.

\* cited by examiner

SPATIALLY LAPPED ENCODING

BACKGROUND

Video encoding has progressed through numerous iterations and standards. As processing and data networking capabilities have improved, video resolutions have also continued to increase. For example, as the resolution standard for display devices such as televisions and monitors moved from 1080p to 4K, a gradual shift has continued to take place from 4K to 8K resolution. In addition, live video streaming has witnessed a large growth in popularity for content delivery as bandwidth and network infrastructure have improved. One approach for constructing incipient live video encoders for a new resolution (such as 4K, 8K, or others) is by combining multiple encoders of a lower resolution, each encoding a region of a video frame.

BRIEF DESCRIPTIONS OF DRAWINGS

DETAILED DESCRIPTION

Various resolutions, aspect ratios, and standards have developed across several generations of video encoding and display. Examples of higher-resolution video resolutions include 720p, 1080p, 2160p, 4K, and 8K (among others). 720p and 1080p refer to high-definition video modes respectively having 720 and 1,080 progressively (p) displayed pixels down the screen vertically. On the other hand, a "4K" resolution refers to an image or display resolution of approximately 4,000 pixels wide (horizontally). 4K ultra-high definition (UHD) having a 3840×2160 resolution is the dominant 4K standard, although the movie projection industry may use the Digital Cinema Initiatives (DCI) 4K standard having a 4096×2160 resolution. A successor to the 4K resolution, an "8K" resolution refers to an image or display resolution with a width of approximately 8,000 pixels. 8K UHD has a 7680×4320 standard resolution for UHD television (UHDTV). Standard 8K has four times as many pixels as standard 4K and has 16 times as many pixels as 1080p. Hence, for live or video-on-demand (VOD) digital content delivery to a user, 3840×2160 can be the standard resolution of choice for 4K video, and 7680×4320 can be the standard resolution of choice for 8K video. The high-resolution content can be delivered over a communications network (e.g., the Internet) to a consumer device such as a networked user device (e.g., a computing device such as a desktop or laptop personal computer, or a mobile device such as a smartphone, tablet, or phablet), or a set-top box associated with one or more display devices (e.g., foregoing networked user device, television, smart TV, monitor, or projector screen).

As resolution sizes and consumption of video content continue to increase, encoder capabilities strive to meet demands. For instance, when 2160p was launched, initial live video encoders worked by subdividing the 3840×2160 frame into a 2×2 grid of 1920×1080 frames. With 8K, incipient live video encoders were constructed from a 2×2 grid of 2160p encoders. This approach of spatial segmentation works to create a larger frame from smaller frames.

Figure 1:
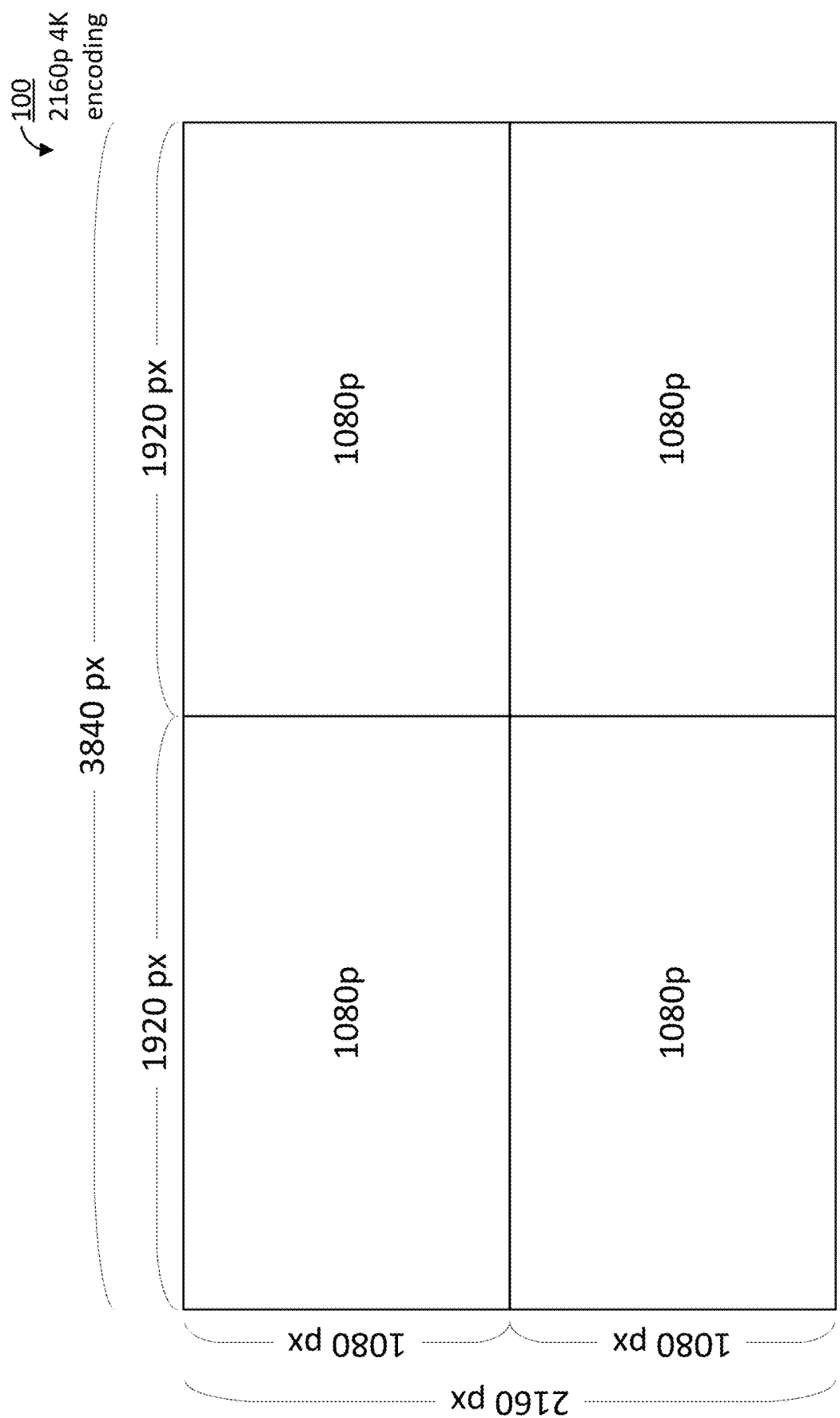
FIG. 1 illustrates an example of such spatial segmentation for encoding a 4K video frame.

FIG. 1 illustrates an example of such spatial segmentation for encoding a 4K video frame 100. In such implementations, High Efficiency Video Coding (HEVC) level 4, 4.1, 5, 5.1, or 5.2 encoders may be used to encode 1080p frame regions each having a resolution of 1920×1080 pixels, and arrange them into a 2×2 grid having a total resolution of 3840×2160 pixels. The sum of the widths of the 1080p frame regions (1920+1920 pixels) would equal the width of the 2×2 grid (3840 pixels).

Figure 2:
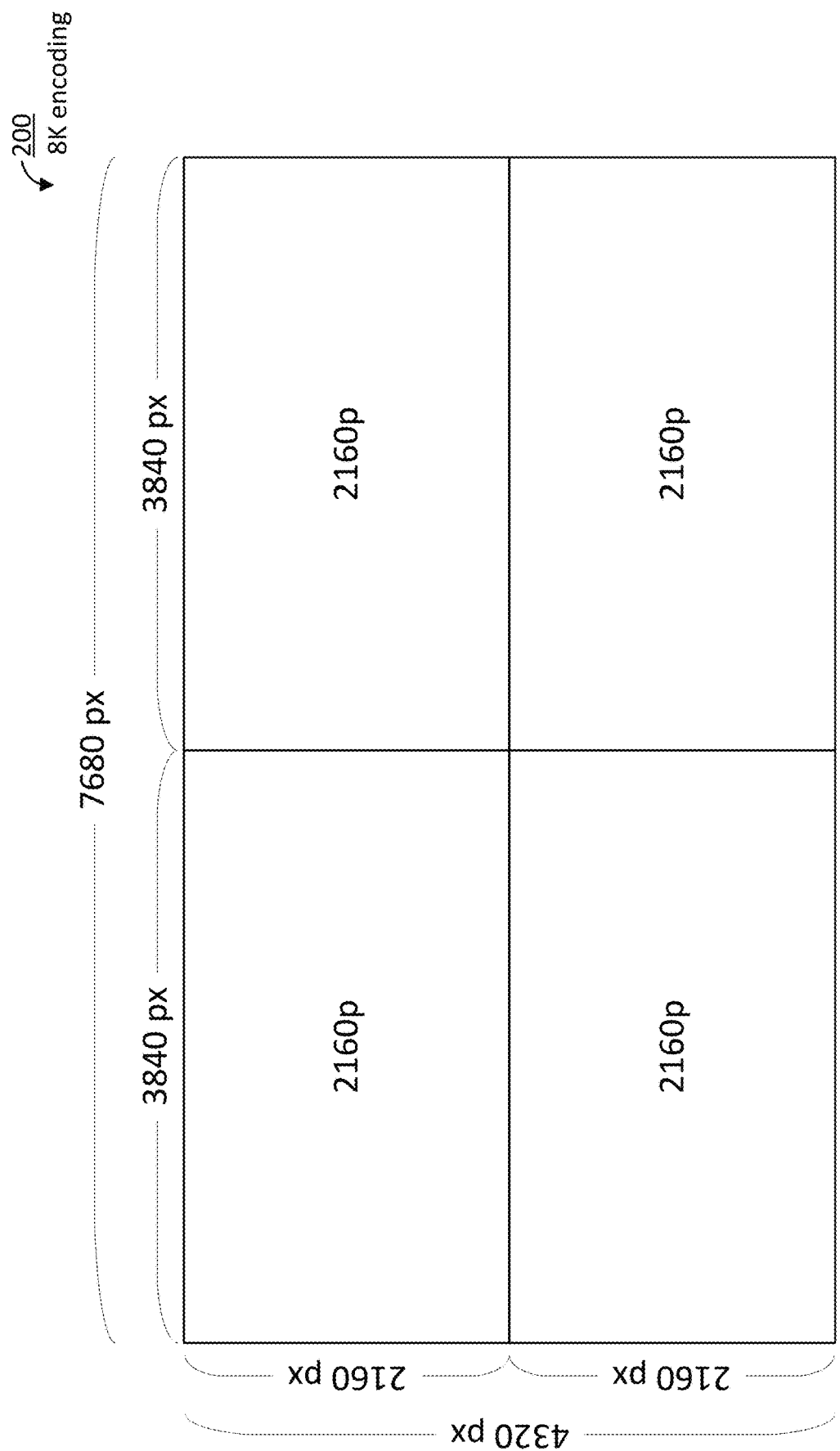
FIG. 2 illustrates an example of spatial segmentation for encoding an 8K video frame.

FIG. 2 illustrates an example of spatial segmentation for encoding an 8K video frame 200. In such implementations, HEVC level 4, 4.1, 5, 5.1, or 5.2 encoders may be used to encode 2160p frame regions each having a resolution of 3840×2160 pixels, and arrange them into a 2×2 grid having a total resolution of 7680×4320 pixels. The sum of the widths of the 2160p frame regions (3840+3840 pixels) would equal the width of the 2×2 grid (7680 pixels).

Using lower-tier encoders such as level 4 and 5 encoders in the manner depicted in FIGS. 1 and 2 thereby allows rendering of high-resolution videos in 4K and 8K resolutions.

However, such an approach requires substantially higher bitrate for the same quality as a unitary encoder can deliver. Simply encoding each quadrant independently in a 2×2 grid risks visual discontinuities, e.g., edges and seams being visible between regions encoded by separate encoders. Moreover, horizontal and vertical lines intersecting at the exact center of the screen is a worst case in terms of visually detectable artifacts. A difference of a few quantization steps or encoding parameters (e.g., quantization parameters (QP)) can be easily visible by the user. Motion discontinuities in cases where motion search is not shared between quadrants when objects cross between quadrants can also be easily detectable.

Figure 3A:
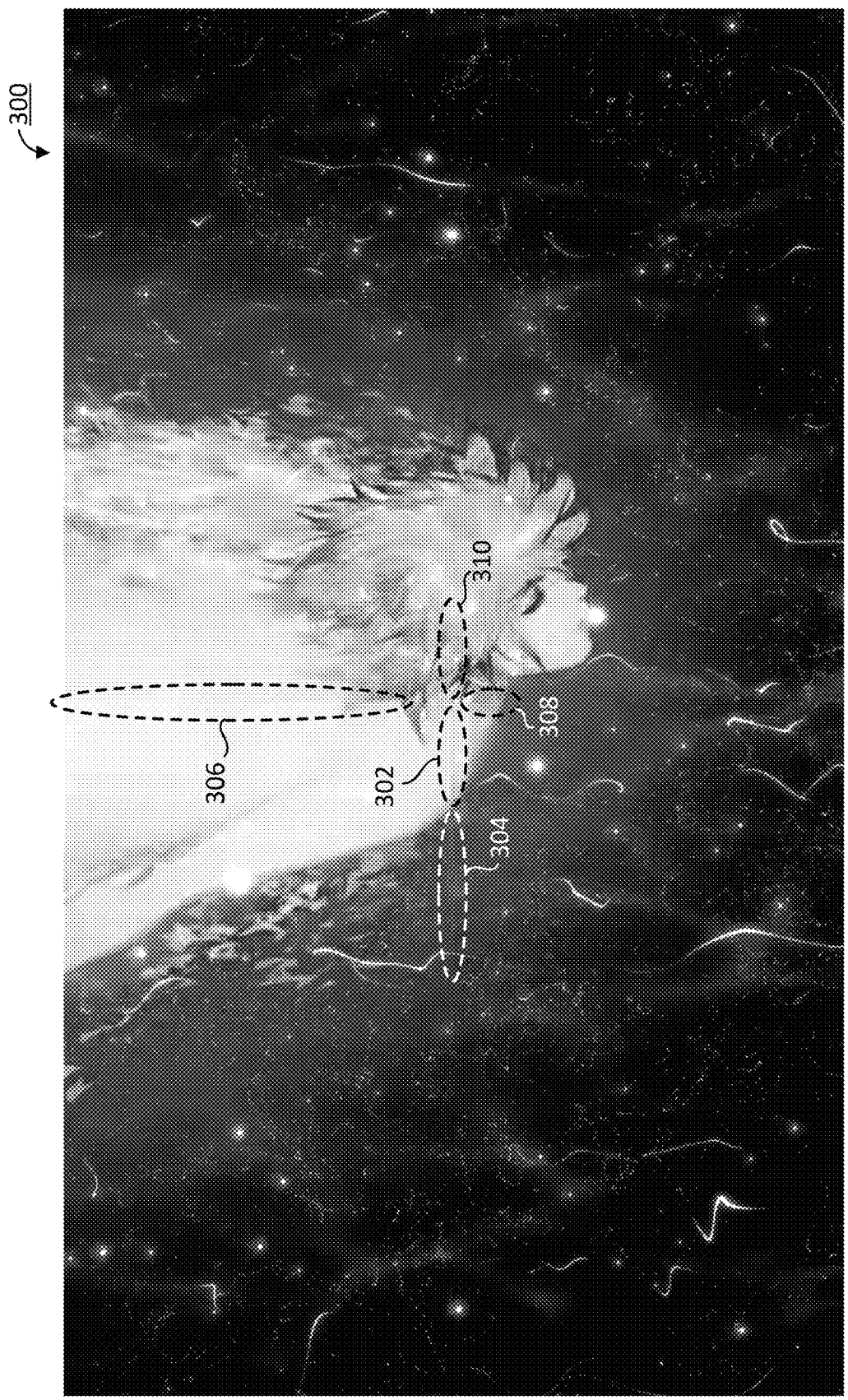
FIGS. 3A-3C depict different views of example video frames constructed using spatial segmentation, which contain visual artifacts.

FIG. 3A depicts an example video frame 300 containing visual artifacts. One visual artifact is shown as a discontinuity 302 between the upper half and the lower half of the video frame 300. The discontinuity 302 may appear as a horizontal seam that persists during playback of a video containing this video frame 300. As another example, a discontinuity 304 extends to the left of the discontinuity 302. A discontinuity 306 appears as a vertical seam between the left half and the right half of the video frame 300. Similarly, a discontinuity 308 extends below the discontinuity 306. A discontinuity 310 appears as a horizontal seam to the right of the discontinuity 302.

These discontinuities 302-310 may arise from, e.g., stitching of the frame regions at each quadrant at the exact boundaries of the frame regions without considering encoding parameters (e.g., QPs) of adjacent frame regions. Using the example of the video frame 200 shown in FIG. 2, each frame region would have a width of 3840 pixels and a height of 2160 pixels, and the video frame would have the exactly twice the dimensions: 7680 pixels in width and 4320 pixels in height. Displaying a high-contrast scene such as that shown in the video frame 300 may result in conspicuously visible discontinuities.

Figure 3C:
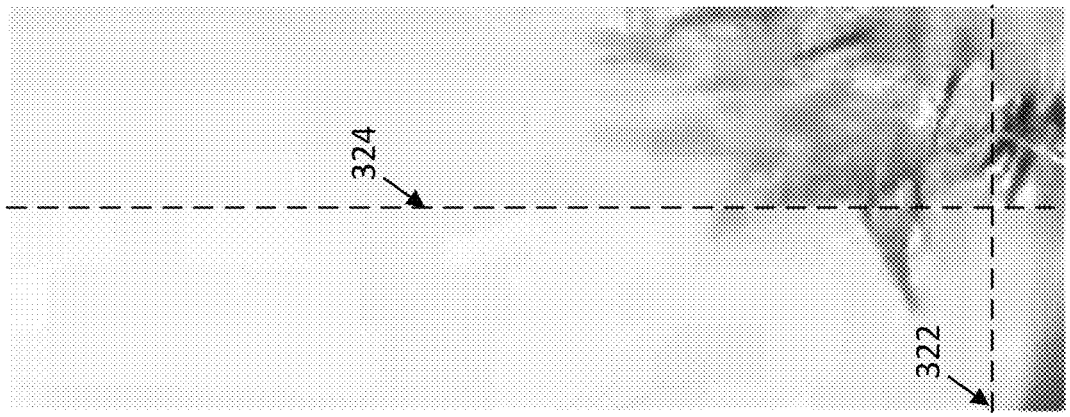
Figure 3B:
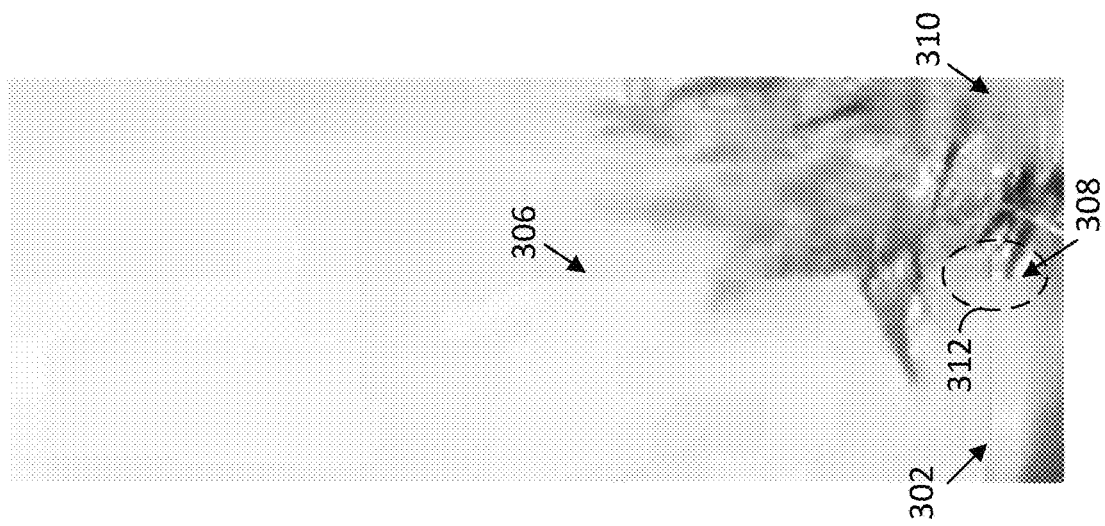

FIG. 3B depicts another view of some of the discontinuities shown in FIG. 3A and an additional discontinuity 312. The discontinuity 302 is shown as a darker horizontal line over a light background. The discontinuity 306 is present along a boundary that separates lighter and darker regions of left and right areas of the video frame 300 despite having a generally similar lighter shade of color in background. To the right of the discontinuity 308 shows part of the character's hair, while the left side of the discontinuity 308 does not. The discontinuity 308 is a visual artifact that clearly separates the left side and right side of the video frame 300. The discontinuity 310 shows a darker line between lighter regions as well. In the middle of these discontinuities is a center discontinuity 312 that results from the aforementioned discontinuities. A cross-shaped visual artifact can be seen where the discontinuities intersect.

FIG. 3C depicts boundary lines 322, 324 between frame regions where discontinuities are likely to occur. These boundary lines 322, 324 correspond to boundaries where neighboring frame regions meet. FIGS. 3A and 3B illustrate that discontinuities arise along these boundary lines 322, 324.

As can be seen, these visual artifacts are undesirable to the user's viewing experience. To this end, the present disclosure provides techniques for spatial segmentations that generate high-resolution (e.g., 4K, 8K) video frames while preventing visual artifacts. Most 4K encoders support up to 4096 pixels wide, despite the standard resolution being 3840 pixels wide. The extra pixels may be used to lap the frame regions to remove the discontinuities without requiring additional encoders.

Spatially Lapped Encoding

Figure 4:
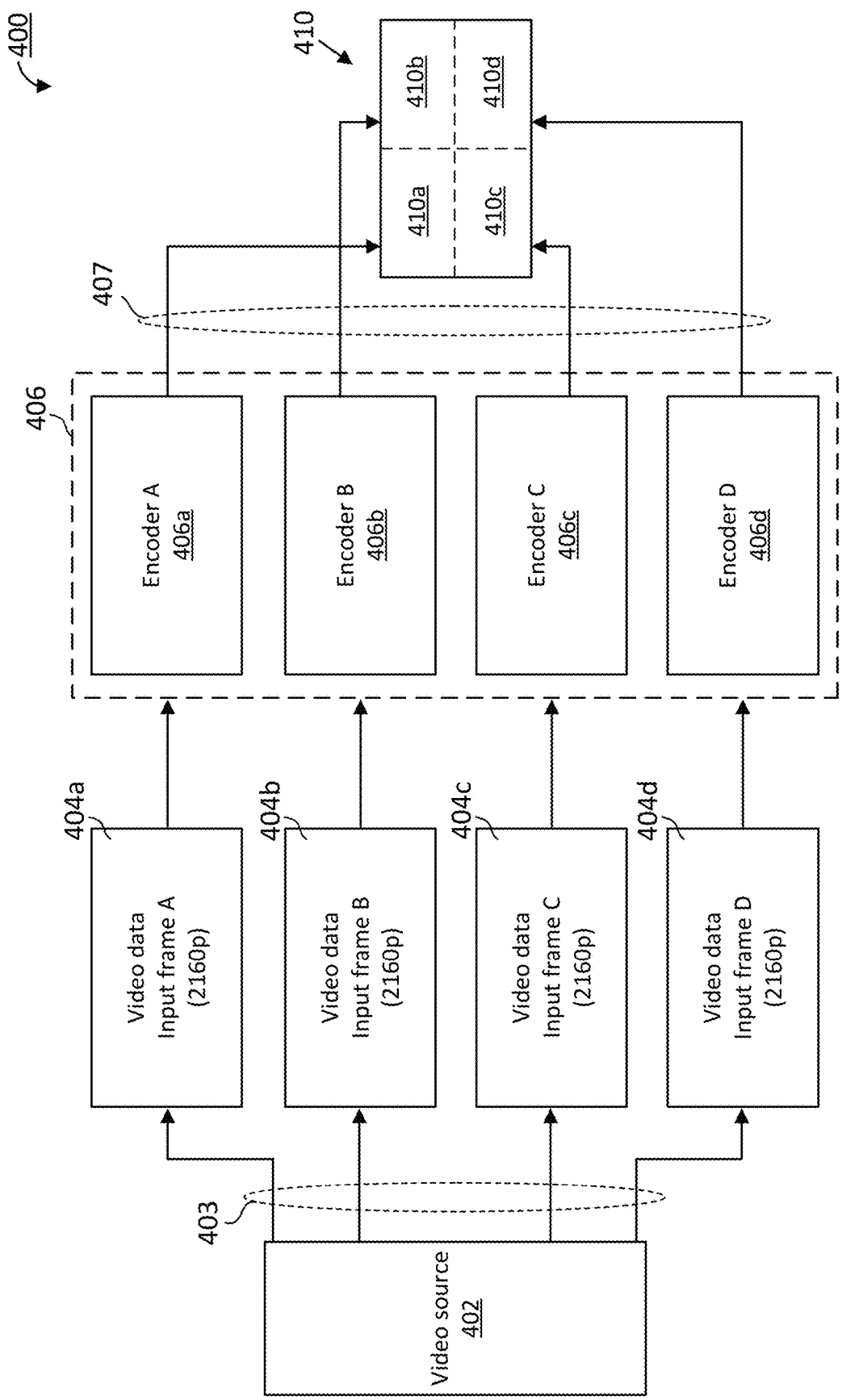
FIG. 4 is a block diagram illustrating a spatially lapped encoding system configured to generate high-resolution video frames, according to some embodiments.

FIG. 4 is a block diagram illustrating a spatially lapped encoding system 400 configured to generate high-resolution video frames, according to some embodiments. In some embodiments, the spatially lapped encoding system 400 includes a video source 402, and an encoder subsystem 406. In some embodiments, encoder subsystem 406 may include one or more encoders configured to receive raw video data 403 from the video source 402. In some embodiments, raw video data 403 or portions thereof may comprise a bitstream transmitted over a data bus or a data network. The raw video data 403 can be represented as portions of a video frame 410 to be rendered. For example, the raw video data 403 may correspond to input frame regions A through D (404a-404d). In some cases, the input frame regions 404a-404d may correspond to respective quadrants of the video frame 410 to be rendered.

In some implementations, the encoder subsystem 406 may receive respective portions of the raw video data 403. For example, the encoder subsystem 406 may include four encoders (or encoder instances) 406a-406d which may be configured to encode respective portions of the raw video data 403 corresponding to the input frame regions 404a-404d. In some implementations, the encoder subsystem 406 may be configured to receive the raw video data 403 and store it, e.g., at a memory or buffer.

Encoders may be hardware encoders, software encoders (e.g., encoder instances), or a combination thereof. Encoders may be configured to perform image and/or video encoding according to one or more compression standards, e.g., High Efficiency Video Coding (HEVC), including H.264 Advanced Video Coding (AVC) or H.265; Moving Picture Experts Group (MPEG) including MPEG-4; FFmpeg; or other lossless or lossy formats.

In some embodiments, the respective portions of the raw video data 403 may correspond to frame regions or quadrants of the video frame 410 to be rendered. For example, a first portion of the raw video data 403 may correspond to a first frame region 410a in a 2×2 grid to be constructed for the video frame 410, a second portion may correspond to a second frame region 410b, a third portion may correspond to a third frame region 410c, and a fourth portion may correspond to a fourth frame region 410d.

In some embodiments, the encoder subsystem 406 may be configured to encode the raw video data 403 and thereby generate encoded video data 407 or portions thereof. Encoded video data 407 or portions thereof may comprise a bitstream transmitted over a data bus or a data network, and may be representative of at least a portion of a video frame 410 to be rendered. In some embodiments, the encoded video data 407 may include respective portions that correspond to respective frame regions 410a-410d of the video frame 410 to be rendered. In some embodiments, the encoded video data 407 may represent one or more frame regions each having a particular resolution, e.g., 4096×2160 pixels. As will be discussed below, at least some of the frame regions may be lapped over each other by a number of pixels.

In some embodiments, the encoder subsystem 406 may be disposed at a computing device, e.g., camera, server, user device, or other media device configured to receive and process video data. A decoder (which may be disposed at another computing device, e.g., user device, display device, set-top box associated with the display device) may be configured to receive encoded video data 407 (including portions thereof) from the encoder subsystem 406 over a data bus or data network.

In some embodiments, the decoder may be configured to decode and/or render the portions of the encoded video data 407 into corresponding frame regions of the video frame 410. Such decode may involve combining the frame regions according to their intended positions (e.g., upper left quadrant, upper right quadrant, lower left quadrant, lower right quadrant) to construct the video frame 410. The frame regions may be decoded serially, or decoded in parallel with multiple instances of the decoder.

The encoding techniques described herein may be performed with live content (e.g., livestreams) or video-on-demand (VOD) content. In some embodiments, the video source 402 may be a host device configured to transmit live content, or a content server where video data is stored.

Figure 5A:
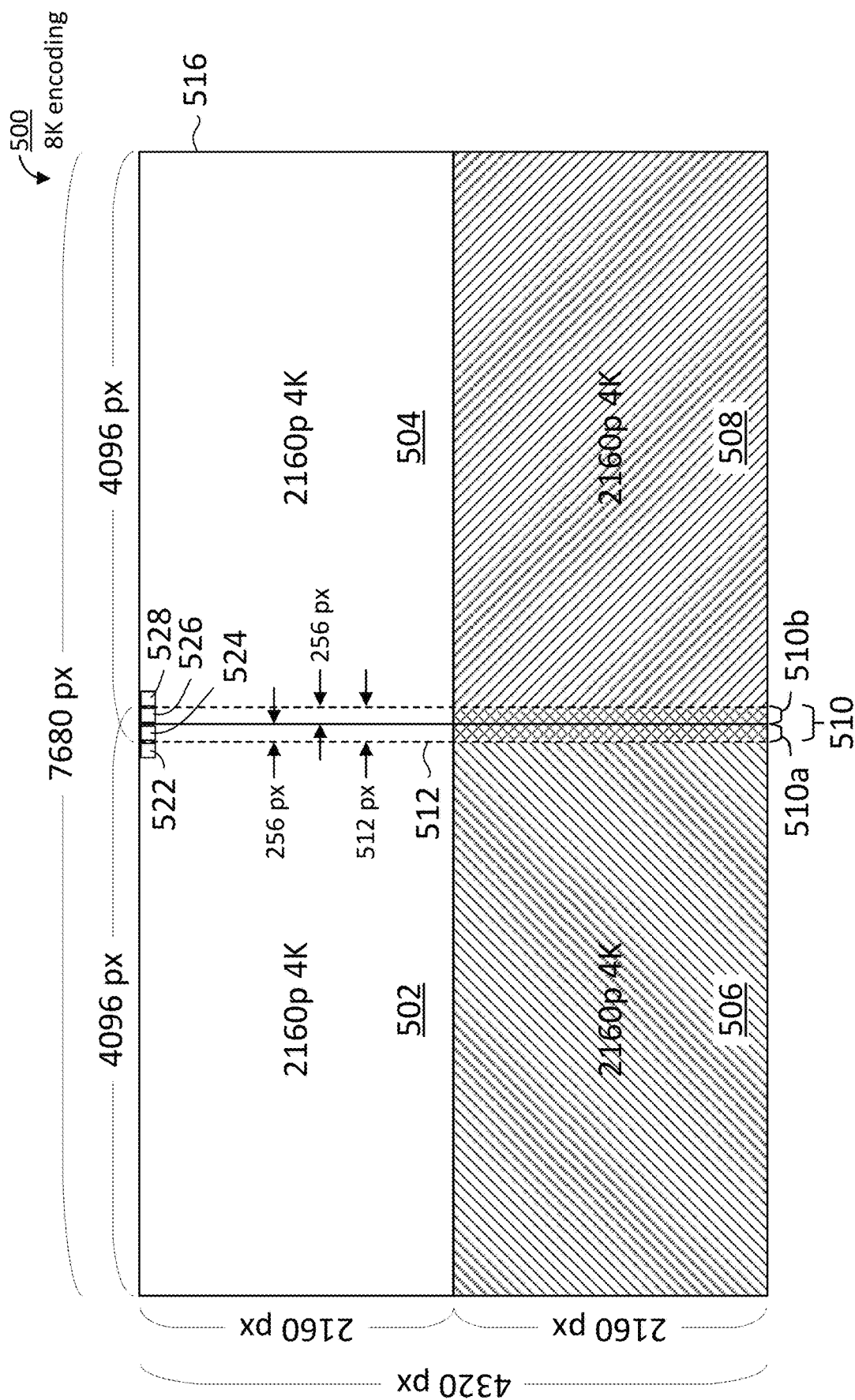
FIG. 5A illustrates an example of a spatially lapped segmentation for encoding an 8K video frame, according to some embodiments.

FIG. 5A illustrates an example of a spatially lapped segmentation for encoding an 8K video frame 500, according to some embodiments. In some embodiments, one or more encoders are configured to encode video data that have a resolution of 4096×2160. For example, as shown in FIG. 5A, frame regions 502, 504, 506, 508 of a video frame 500 are arranged into quadrants in a 2×2 grid, and each of the frame regions 502, 504, 506, 508 have a resolution of 4096×2160. Frame region 502 may be encoded by a first encoder, frame region 504 may be encoded by a second encoder, frame region 506 may be encoded by a third encoder, and frame region 508 may be encoded by a fourth encoder. In some embodiments, the frame regions 502, 504, 506, 508 may be encoded concurrently by the respective encoders. Encoding of pixels blocks may be performed with different encoding parameters (e.g., quantization parameters), as will be further discussed below. Encoders 406a-406d may be examples of the first through fourth encoders.

In some embodiments, some of the frame regions at least partially lap at least another frame region. For instance, as shown in FIG. 5A, frame region 502 partially laps frame region 504 by 512 pixels, since each frame region is 256 pixels over the standard 4K width of 3840 pixels (4096−3840=256). In this case, frame region 506 also partially laps frame region 508 by a total of 512 pixels. The total width of the video frame 500 remains 7680 pixels according to the standard 8K resolution. That is, despite the frame regions 502, 504, 506, 508 being encoded in a wider resolution, the video frame 500 constructed from the frame regions is still has the standard 8K resolution of 7680×4320. Put another way, the resolution of the video frame 500 (7680×4320) is larger than the resolution of an individual frame region but less than the sum of the resolutions of the four frame regions ((4096+4096)×(2160+2160)).

In some embodiments, redundant encoding occurs for the overlapping region 510 because of the encoding of the frame region 502 and the frame region 504, which are adjacent to each other and are wider than can fit within the standard 8K width of 7680 pixels.

In some encoding schemas, the portion of the frame region 502 corresponding to the overlapping region 510 and encoded by the first encoder may be discarded. This may result in the entirety of the frame region 504 encoded by the second encoder to be used in the video frame 500, from left seam 512 to the right edge 516 of the video frame 500. The first encoder and the second encoder may both begin encoding from the upper left corner of respective frame regions 502, 504. More specifically, the second encoder may begin encoding the frame region 504 from a pixel block 524. A pixel block may include a two-dimensional array of pixels, and may be an 8×8 block of pixels, a 16×16 block of pixels, a 32×32 block of pixels, a 64×64 block of pixels, etc., depending on the encoding scheme. At a border region adjacent to the overlapping region 510, a pixel block 522 associated with the frame region 502 encoded by the first encoder may be disposed adjacent to the pixel block 524. The border region adjacent to the overlapping region 510 may be as wide as the pixel block 522. In some implementations, the width of the border region may be greater than the pixel block 522.

In some embodiments, an encoding parameter of the pixel block 522 may be determined based on an encoding parameter of the pixel block 524. The encoding parameter may affect the compression, bit rate, and quality of the encoded pixels such as color and brightness. For example, the encoding parameter can be a quantization value. By way of illustration, quantization in an H.264 encoder may be controlled by a quantization parameter (QP) that ranges from 0 to 51. Selection of the QP values by an encoder can be a tradeoff between size and quality. Higher QP values may indicate higher quantization, more compression, and lower output video quality, and lower QP values may indicate lower quantization, less compression, and higher output video quality. The QP is used to scale frequency components of the pixel block during the encoding process, and different QP values may affect the appearance of the pixel block when decoded. In the case of frame regions 502 and 504, the closer their encoding parameters, the more "seamless" the image will appear and the fewer discontinuities such as those shown in FIGS. 3A-3C will be visible. In some implementations, when the first encoder encodes pixel block 522, the first encoder can adjust the encoding parameter of the pixel block 522 to be within a prescribed range (e.g., 2 QP steps) of the encoding parameter of the pixel block 524. Since pixel block 524 has already been encoded by the second encoder by the time the first encoder encodes pixel block 522, the first encoder can obtain the encoding parameter used by the second encoder for pixel block 524, and adjust the encoding parameter for pixel block 522 accordingly. In some implementations, the encoding parameter of the pixel block 522 may be adjusted to be the same in value as the encoding parameter of the pixel block 524.

Other types of encoding parameters used by the second encoder that the first encoder can take into account when encoding the border region may include pixel block partition decisions (see, e.g., FIG. 5C discussed below), transform skip mode decisions, motion vector data, lookahead rate control decisions, etc. As with quantization values, when the first encoder takes into account the encoding parameters used by the second encoder of the adjacent overlapping frame region, the first encoder can adjust its own encoding parameters for encoding the broader region to be similar (e.g., within a threshold range), or be the same as what the second encoder used. In some implementations, if there is a large difference (greater than a certain threshold) between the original encoding parameter that the first encoder had intended to use and the encoding parameter used by the second encoder, the first encoder may request the second encoder to adjust the encoding parameter used for the overlapping region and re-encode the overlapping region so as to balance the difference between the two encoders.

In the example described above, the upper left frame region is stitched together with the upper right frame region along the left edge seam of the overlapping region 510, and the overlapping region 510 is encoded twice, resulting in some encoded data being discarded. The two lower frame regions can be encoded similarly. In other implementations, the stitching edge of the frame regions in the resulting encoded video frame can be located anywhere in the overlapping region 510, and it may not be necessary for each encoder to encode the full 4096×2160 pixel frame regions.

Three salient regions can be considered for an encoder: an "analysis region," an "encoding region," and an "exclusive region." The analysis region can be the full 4096×2160 pixel frame region that each encoder receives and performs analysis on. The exclusive region is the portion of the 4096×2160 pixel frame region that is exclusive to the encoder. In other words, the exclusive region is the portion of the frame region that excludes any overlapping. The encoding region is the region that the encoder actually encodes. The encoding region can range from the exclusive region up to the analysis region, depending on the location of the stitching edge and whether double encoding in overlapping region is acceptable.

In some encoding schemas, to minimize the encoding latency and avoid encoding the overlapping regions twice, the stitching edge can be located at the center line of the overlapping region 510. Hence, the resulting encoded frame can have equal pixel contributions from the first and second encoders. The analysis region of the second encoder can extend from the left seam of region 510 to the right edge of the video frame 516, but encoding region of the second encoder can be from the center line of region 510 to the right edge 516. For example, the second encoder may perform analysis on pixel blocks 524 and 526 to determine encoding parameters to use for these pixel blocks, but encodes pixel block 526 without encoding pixel block 524. The encoding region for the first encoder can extend from the left edge of the video frame to the center line of region 510. The first encoder can encode pixel block 522 taking into account the encoding parameters determined by the second encoder for pixel block 524, and similarly encode pixel block 524 taking into account the encoding parameters determined by the second encoder for pixel block 526. From the perspective of the first encoder, pixel block 522 can be part of a border region adjacent to the overlapping region that includes pixel block 524, and pixel block 524 can be part of a border region adjacent to the overlapping region that includes pixel block 526. Hence, in some implementations, each encoder may encode only the portion that the encoder contributes to the encoded video output frame, but may perform analysis on a larger region to provide encoding parameters to the adjacent encoders.

In some embodiments, the encoding schema for pixel blocks along the overlapping region can be determined based on the relative complexity of the frame regions. A frame region having image portions that are relatively more complex (e.g., has more high frequency components) than another frame region may control. For instance, if frame region 504 has more high frequency components than frame region 502, the encoding of the overlapping region 510 by the second encoder is kept for the combined video frame output. However, if frame region 502 has more high frequency components than frame region 504, the encoding of the overlapping region 510 by the first encoder is kept for the combined video frame output.

Figure 5B:
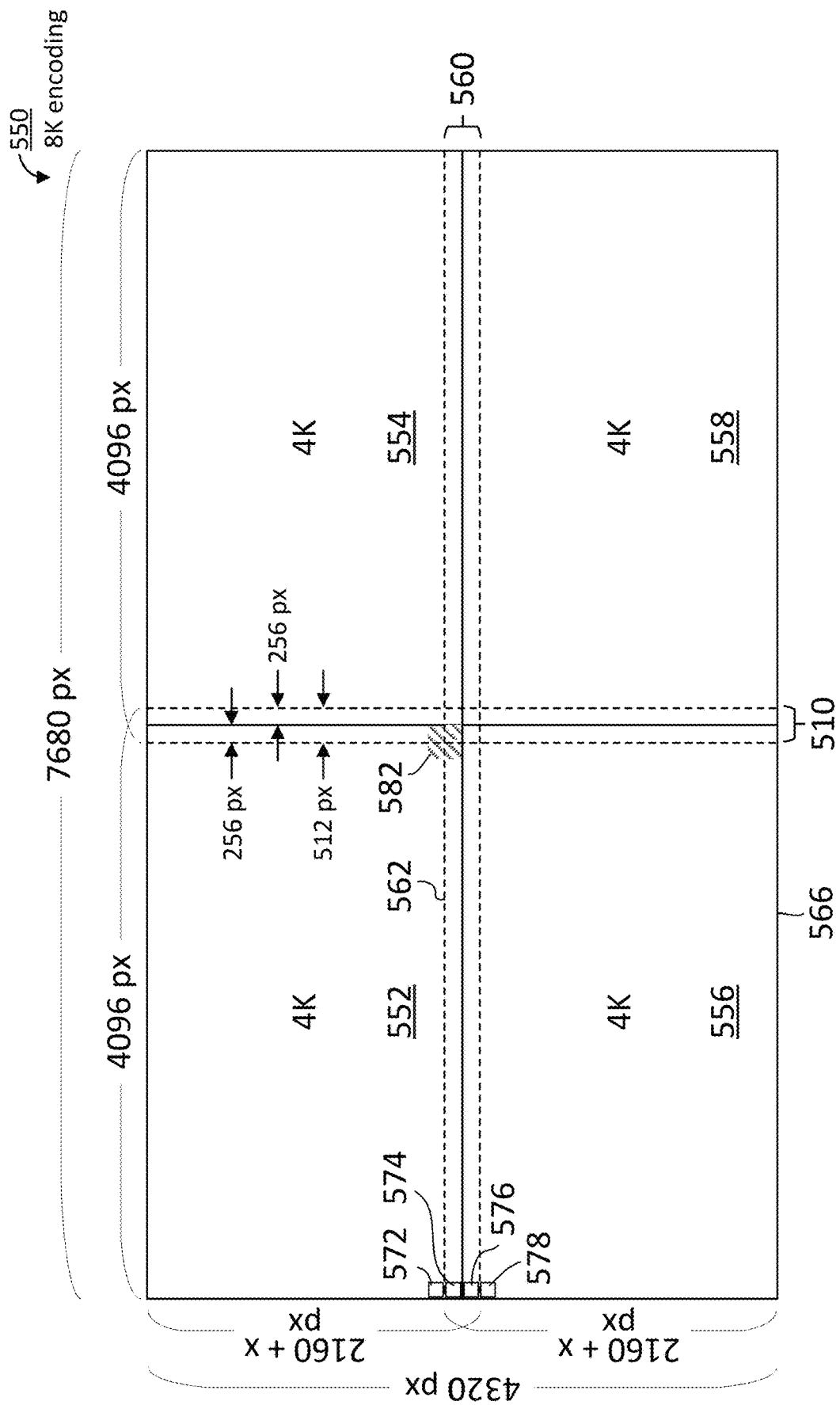
FIG. 5B illustrates another example of a spatially lapped segmentation for encoding an 8K video frame, according to some embodiments.

FIG. 5B illustrates another example of a spatially lapped segmentation for encoding an 8K video frame 550, according to some embodiments. Similar to the lapping of frame regions performed as shown in FIG. 5A, vertical lapping may reduce discontinuities between upper and lower frame regions. In some embodiments, one or more encoders are configured to encode video data into frame regions that have a resolution of (4096) (2160+x). That is, the encoding height is greater than the standard resolution of 3840×2160. In various implementations, the encoders may be configured to support 4096 pixels wide and 2304 pixels tall, 2560 pixels tall, or 3200 pixels tall. For example, an encoder configured to encode at 4096×2304 or 3840×2304 may be used. Hence, vertical lapping may be achieved when arranging 4K frame regions having heights that when summed are greater than the standard 8K height of 4320 pixels tall.

In the example of FIG. 5B, a first encoder may encode a frame region 552, a second encoder may encode a frame region 554, a third encoder may encode a frame region 556, and a fourth encoder may encoder a frame region 558. Encoders 406a-406d may be examples of the first through fourth encoders.

In some embodiments, a second overlapping region 560 (in addition to the overlapping region 510) may be created by lapping an upper frame region (e.g., 552 or 554) with a lower frame region (e.g., 556 or 558). In some encoding schemas, the portion of the frame region 552 corresponding to the second overlapping region 560 and encoded by the first encoder may be discarded. This may result in the entirety of the frame region 556 encoded by the third encoder to be used in the video frame 550, from top seam 562 to the bottom edge 566. When the first encoder encodes pixel block 572 of a border region, the first encoder can adjust an encoding parameter of pixel block 572 based on an encoding parameter of pixel block 574 of the second overlapping region 560 used by the third encoder for encoding pixel block 574.

In some encoding schemas, the resulting encoded frame can have equal pixel contributions from the first encoder and the third encoder. For example, the resulting encoded frame can retain pixel block 574 encoded by the first encoder, and retain pixel block 576 encoded by the third encoder. In such implementations, the encoding parameter of pixel block 574 used by the first encoder can be adjusted based on an encoding parameter of pixel block 576 of the second overlapping region 560 used by the third encoder.

In some encoding schemas, the resulting encoded frame can retain the portion of the frame region 552 corresponding to the second overlapping region 560 and encoded by the first encoder. The portion of the frame region 556 corresponding to the second overlapping region 560 and encoded by the third encoder may be discarded. In such implementations, the encoding parameter of the pixel block 576 used by the first encoder can be adjusted based on the encoding parameter of pixel block 578 associated with the frame region 556 used by the third encoder.

In some embodiments, as shown in FIG. 5B, the vertical lapping may occur with the horizontal lapping as shown in FIG. 5A. In corners where pixel block 582 is adjacent to more than one other frame region, the encoding parameter may be determined based on either adjacent frame region (e.g., 554 or 556). In some cases, the encoding parameter of the adjacent frame region having a more complex image portions (e.g., that have high frequency components) may be the basis for determining the encoding parameter of the pixel block 582.

In some embodiments, the vertical lapping may occur without the horizontal lapping as shown in FIG. 5A.

Figure 5C:
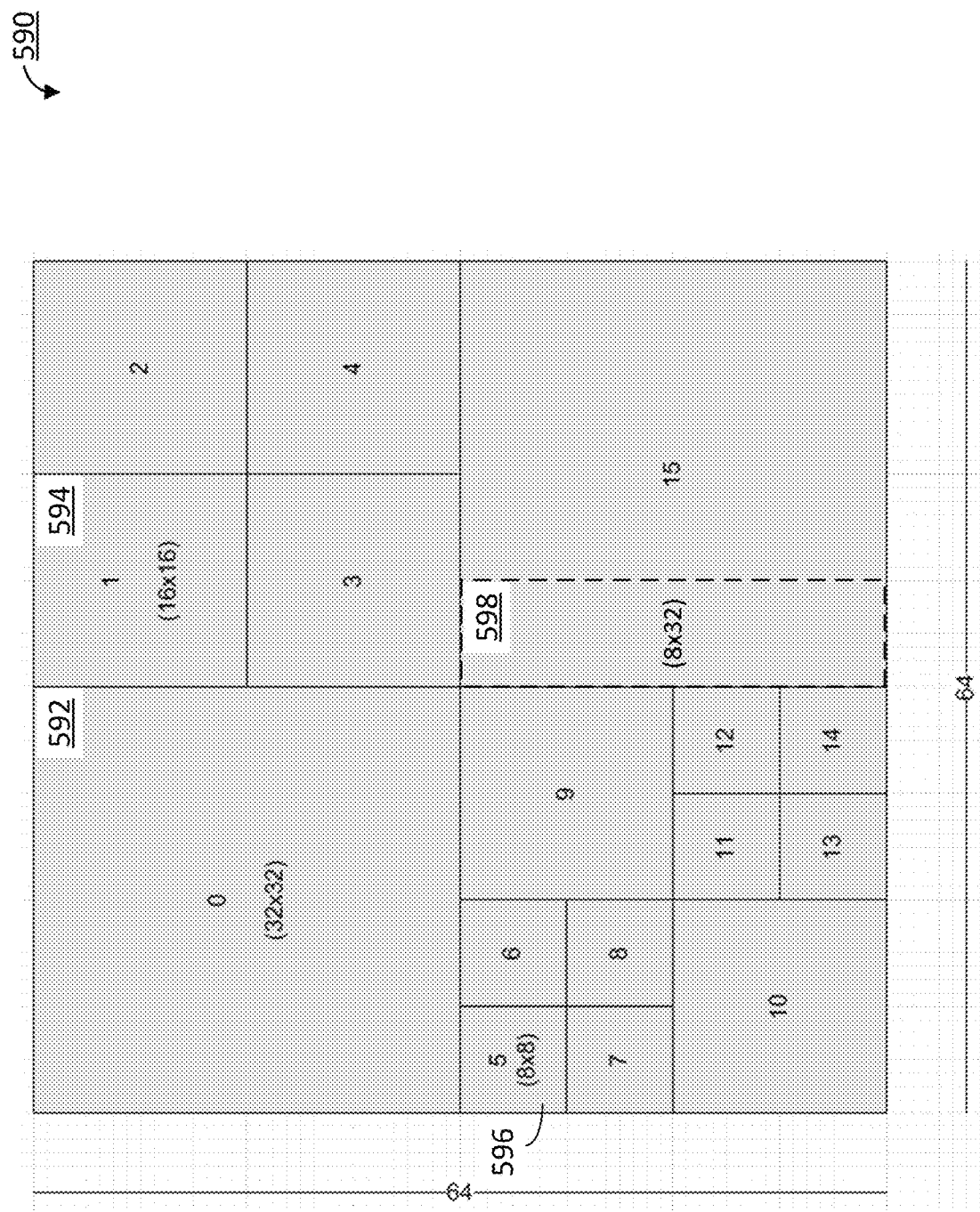
FIG. 5C illustrates an example pixel block having partitions, according to some embodiments.

FIG. 5C illustrates an example pixel block 590 having partitions, according to some embodiments. As shown, the example pixel block 590 is a 64×64 pixel block. It may have a plurality of partitions having smaller pixel dimensions, such as a 32×32 partition 592, a 16×16 partition 594, and an 8×8 partition 596. In some embodiments, a pixel block may include non-square partitions, such as an 8×32 partition 598. In some embodiments, encoding of the pixel block 590 may include a determination of partition sizes and/or locations within the pixel block 590. The partition size or location may be additional examples of the encoding parameter used by an encoder for an adjacent frame region.

Figure 6A:
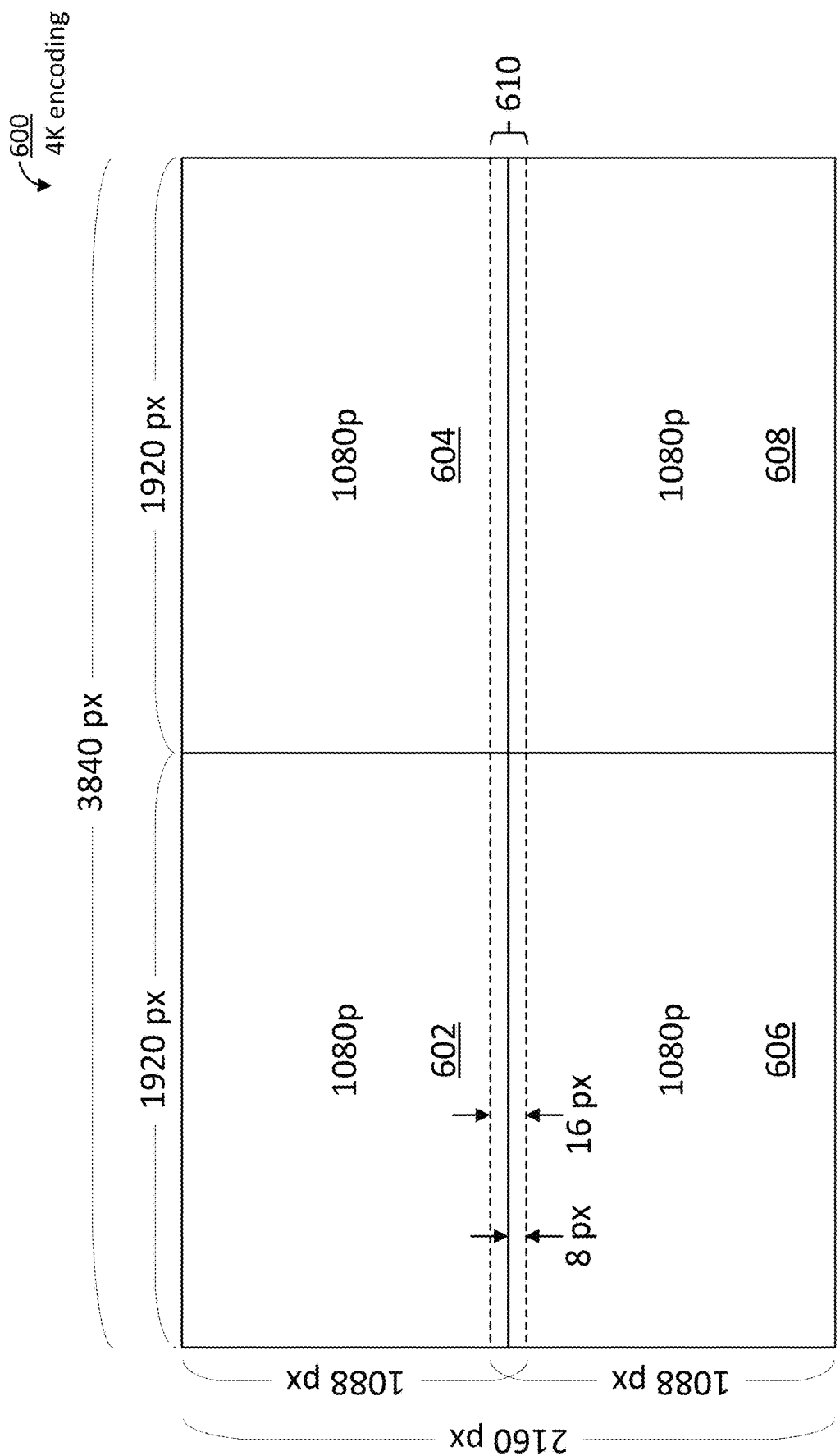
FIG. 6A is an example of a spatially lapped segmentation for encoding a 4K video frame, according to some embodiments.

FIG. 6A is an example of a spatially lapped segmentation for encoding a 4K video frame 600, according to some embodiments. In some embodiments, vertical lapping may occur with 1080p encoders, which may be capable of encoding frame regions that are taller than the standard 1920×1080. In some embodiments, the encoders (which may be example of the encoders 406a-406d of FIG. 4) may be configured to encode video data into respective frame regions 602, 604, 606, 608 that have a resolution of 1920× 1088. This results in each frame region being 8 pixels over the standard height. In this case, frame region 602 would partially lap frame region 606 by a total of 16 pixels, creating an overlapping region 610.

Similar to the vertical lapping as described with respect to FIG. 5B, the encoding of a border region adjacent to (e.g., above) the overlapping region 610 may be performed in various encoding schemas as described above in order to create a more "seamless" image without discontinuities of the kind depicted in FIGS. 3A-3C.

Figure 6B:
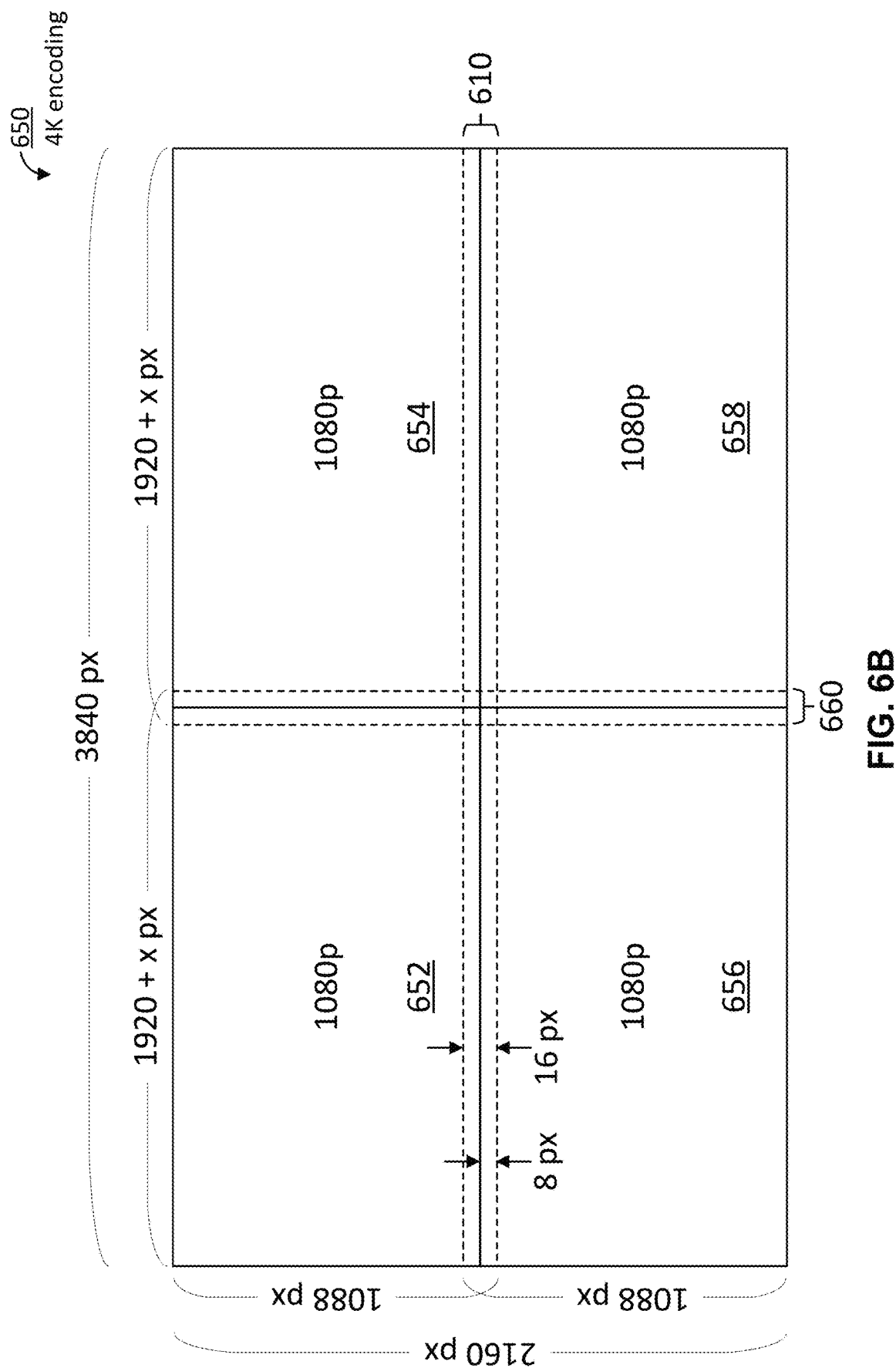
FIG. 6B is another example of a spatially lapped segmentation for encoding a 4K video frame, according to some embodiments.

FIG. 6B is another example of a spatially lapped segmentation for encoding a 4K video frame 620, according to some embodiments. In some embodiments, horizontal lapping may occur with 1080p encoders, which may be capable of encoding frame regions that are wider and/or taller than the standard 1920×1080. In some embodiments, the encoders (which may be example of the encoders 406a-406d of FIG. 4) may be configured to encode video data into respective frame regions 602, 604, 606, 608 that have a resolution of (1920+x) (1088). That is, the encoding width is greater than the standard resolution of 1920×1080. In various implementations, the encoders may be configured to support 2160 pixels wide, 2560 pixels wide, or 2400 pixels wide. For example, an encoder configured to encode at 2160×1088 or 2160×1080 may be used. However, it will be recognized that encoders supporting other similar widths may be implemented. Hence, vertical lapping may be achieved when arranging 1080p frame regions having heights that when summed are greater than the standard 4K height of 2160 pixels tall.

In the example of FIG. 6B, a first encoder may encode a frame region 652, a second encoder may encode a frame region 654, a third encoder may encode a frame region 656, and a fourth encoder may encoder a frame region 658. Encoders 406a-406d may be examples of the first through fourth encoders. Various encoding schemas as described above may be implemented with the overlapping region 610 and (horizontal) overlapping region 660 to reduce visual discontinuities and achieve a more visually seamless experience when using spatially lapping segmentation to construct higher-resolution video frames.

Parallel Image Processing

Figure 7:
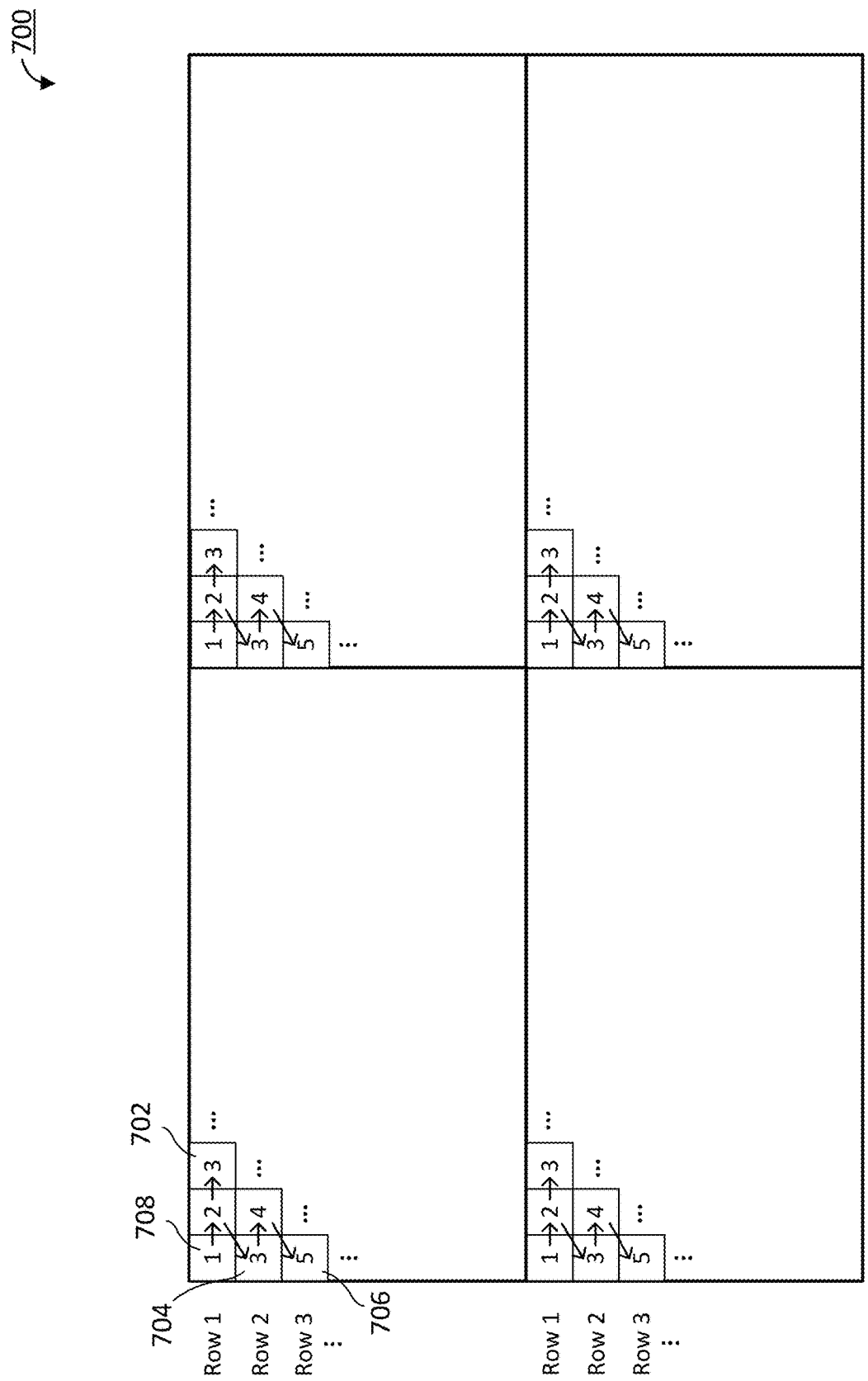
FIG. 7 is a simplified diagram that illustrates an approach for parallel image processing for a video frame, according to some embodiments.

FIG. 7 is a simplified diagram that illustrates an approach for parallel image processing for a video frame 700, according to some embodiments. In some embodiments, image portions or partitions of each frame region may be processed in parallel (e.g., using wavefront parallel processing) without incurring high coding losses. Rows of pixel blocks may be encoded in order depicted. For instance, in the first row, pixel blocks 1 through 3 may be encoded in that order. An offset may be enforced between the first and second rows to allow predictions (e.g., motion predictions), which may involve left, top-left, top, and top-right blocks to be available for referencing for correct predictions. In some implementations, a shift of more than one block (e.g., at least two blocks as depicted in FIG. 7) may be enforced to ensure correct predictions. Thus, in the upper-left frame region, the first row may encode two consecutive pixel blocks, and the second row may encode a first pixel block 704 as a third pixel block 702 is encoded in the first row. A first pixel block 706 of the third row may be encoded as the third pixel block of the second row is encoded. This encoding approach is performed in parallel with all the other frame regions. The first pixel block 708 of the upper-left frame region is thus encoded simultaneously with the first pixel block of the other frame regions, although depending on the image being encoded, the encoding of the entirety of the frame regions may finish at different times.

Figure 8A:
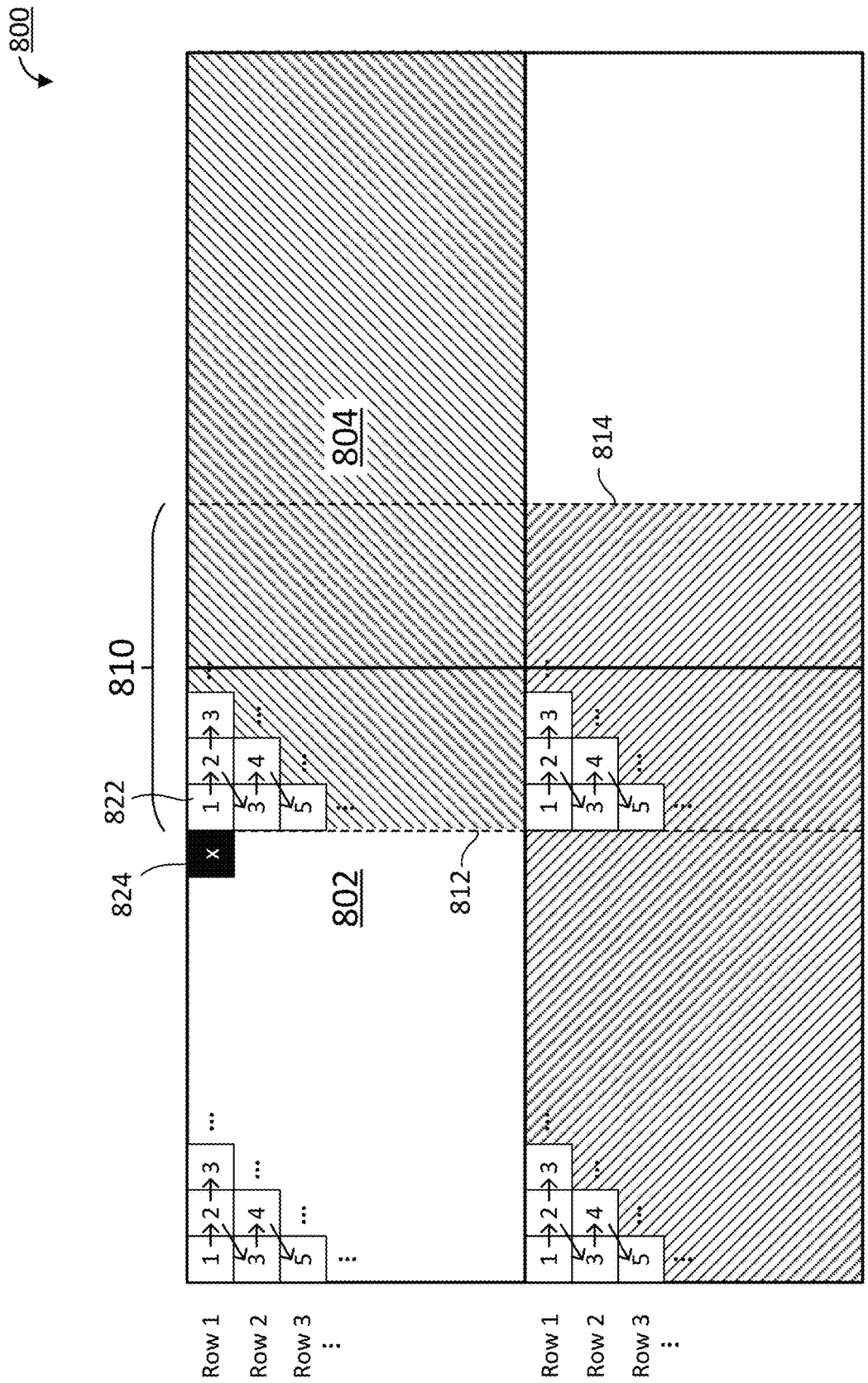
FIGS. 8A and 8B are diagrams that illustrate approaches for parallel image processing with spatially lapped segmentation of a video frame, according to some embodiments.

FIG. 8A is a simplified diagram that illustrates an approach for parallel image processing with spatially lapped segmentation of a video frame 800, according to some embodiments. In some embodiments, horizontal and/or vertical lapping may be performed, according to the approach described with respect to FIGS. 5A-6B. Hence, at least one overlapping region 810 may exist (not drawn to scale in FIG. 8), and the encoding of a right-side frame region 804 may inform the encoding of a left-side frame region 802. For instance, an encoding parameter (e.g., quantization parameter) of a pixel block 824 at a border region of a row of the left-side frame region 802 may be determined based on an encoding parameter of a first pixel block 822 of a row of the right-side frame region 804. In some implementations, when encoding pixel block 824, the encoder operating on frame region 802 can adjust the encoding parameter of the pixel block 824 to be within a prescribed range (e.g., 2 QP steps) of the encoding parameter of the pixel block 822 used by the encoder operating on frame region 804. In some implementations, the encoding parameter of the pixel block 824 can be adjusted to be the same in value as the encoding parameter of the pixel block 822. This way, with relatively similar encoding parameters, visual discontinuities between at a seam between frame regions (e.g., boundary 812) of the overlapping region may be minimized.

In some embodiments, the encoding of the left-side frame region 802 may continue until it reaches the full width of the encoding resolution at boundary 814. Note that spatially lapped encoding involves encoding of resolutions above the standard resolution, e.g., 3840×2160 or 1920×1080.

Figure 8B:
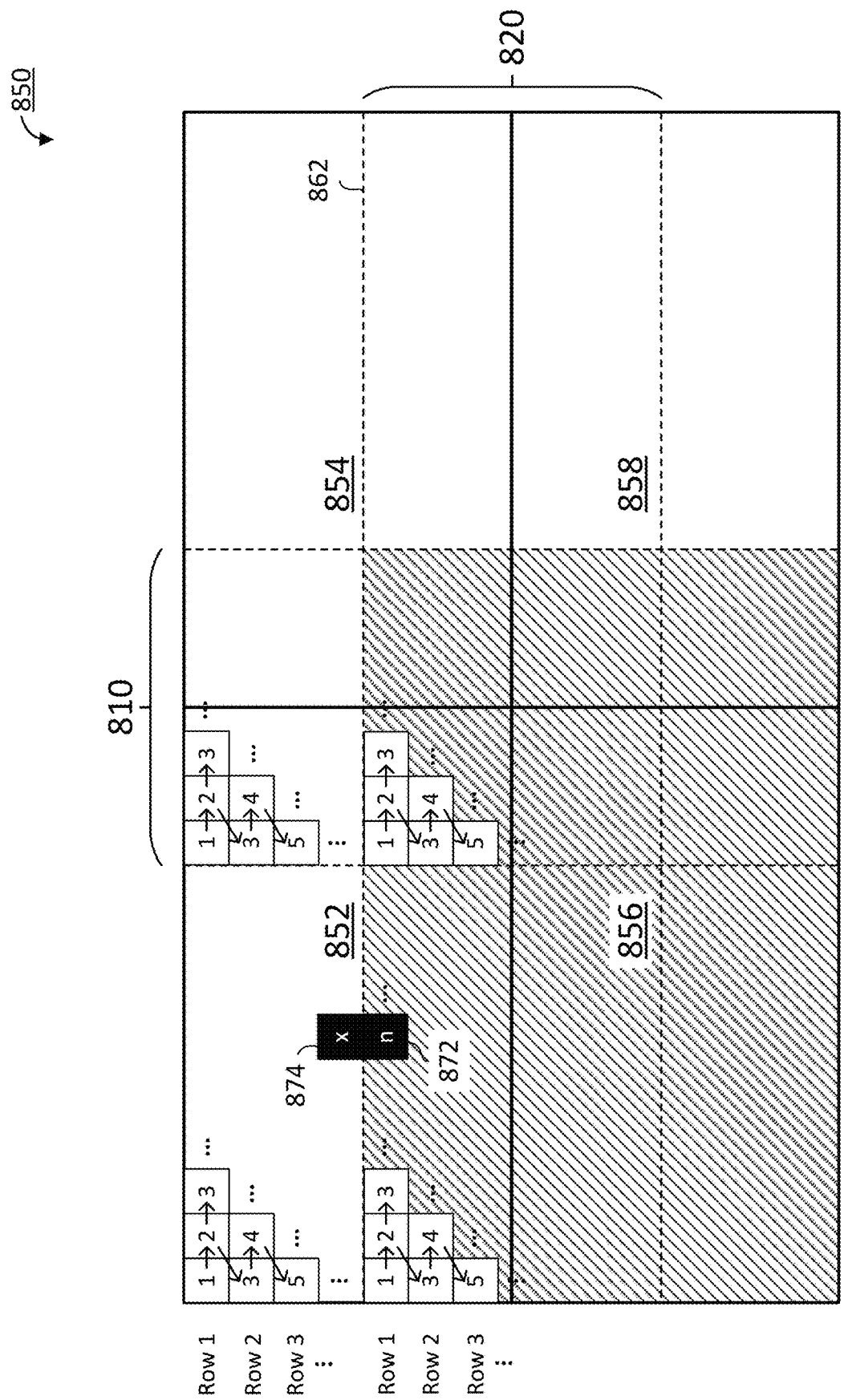

Similarly, as illustrated in FIG. 8B, the encoding of the left-side frame region 852 of a video frame 850 may be informed by the encoding of a bottom-side frame region 856 within an overlapping region 820. In some implementations, the encoding parameter of the pixel block 874 may be within a prescribed range (e.g., 2 QP steps) of or may be the same in value as the encoding parameter of the pixel block 872 to minimize visual discontinuities between at a seam between frame regions (e.g., boundary 862).

As noted elsewhere above, in corners where a pixel block (e.g., one associated with frame region 852) is adjacent to more than one other frame region, the encoding parameter may be determined based on either adjacent frame region (e.g., 854 or 856).

Optimal bitrate allocations for frame regions or spatial segments thereof will often be similar to those of the previously encoded frames. However, using data from prior frames or prior blocks can enable better predictions of bitrates for the current frame where frame regions overlap. In some embodiments, allocations of bits may depend on complexity of the frame region or spatial segments within the frame region (e.g., where there are high frequency image components). As an example, the frame region 852 may have a relatively consistent picture (e.g., mostly one color), which may be determined from information about the prior-encoded pixel blocks. For example, quantization parameters (QPs) for pixel blocks 1, 2, and 3 (and so on) of frame region 852 may be consistently high, e.g., above a threshold and within a number of QP steps, indicating high quantization, more compression, and low quality. In addition or alternatively, high QPs may also be consistently high when evaluated with video frames prior to the current video frame (e.g., 850). Thus, a smaller portion (e.g., 5%) of the bits needed for the video frame 850 may be allocated to the frame region 852. Rate control may thereby be achieved for portions within a video frame.

In some embodiments, "lookahead" rate control may be used to determine how many bits are allocated for a given temporal frame across multiple frames. In some implementations, a two-pass average bitrate approach may be used to determine the cost of encoding a frame in a first pass of the frames and then, in a second pass, more efficiently distribute the bits available to keep output video quality consistent across all frames temporally despite the bitrate varying over time. Expanding upon the above example, the frame region 852 of the video frame 850 may have a relatively consistent picture, but the corresponding frame region of a future video frame may have many high frequency components. This can indicate to the first encoder to preserve or reduce the number of bits for later. In some implementations, the first encoder may consider the complexity of other frame regions (e.g., 854, 856 and/or 858) to determine whether to preserve bits or not. In some cases, an average number of bits needed for a given frame region across multiple frames may be considered by the first encoder. In some cases, an average number of bits needed for multiple or all frame regions across multiple frames may be considered by the first encoder.

Figure 9A:
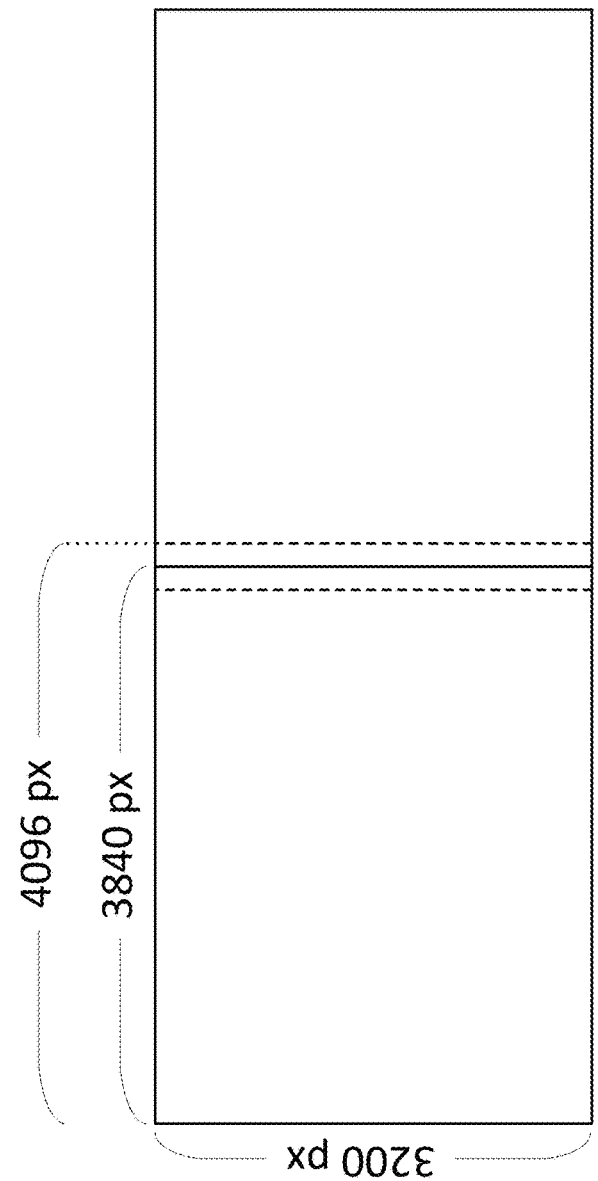
FIGS. 9A and 9B illustrate example applications of the spatially lapped segmentation described herein for encoding widescreen video frames, according to some embodiments.

FIG. 9A illustrates an example application of the spatially lapped segmentation described herein for encoding a widescreen video frame, according to some embodiments. In some embodiments, a super ultrawide video frame 900 having a 36:10 resolution (which may also referred to as "Ultra-Widescreen 3.6") may be constructed using two frame regions. For example, the encoding approach described with respect to FIG. 5A may be used in this case with two encoders to generate two encoded 4096×3200 frame regions, which can be lapped horizontally.

Figure 9B:
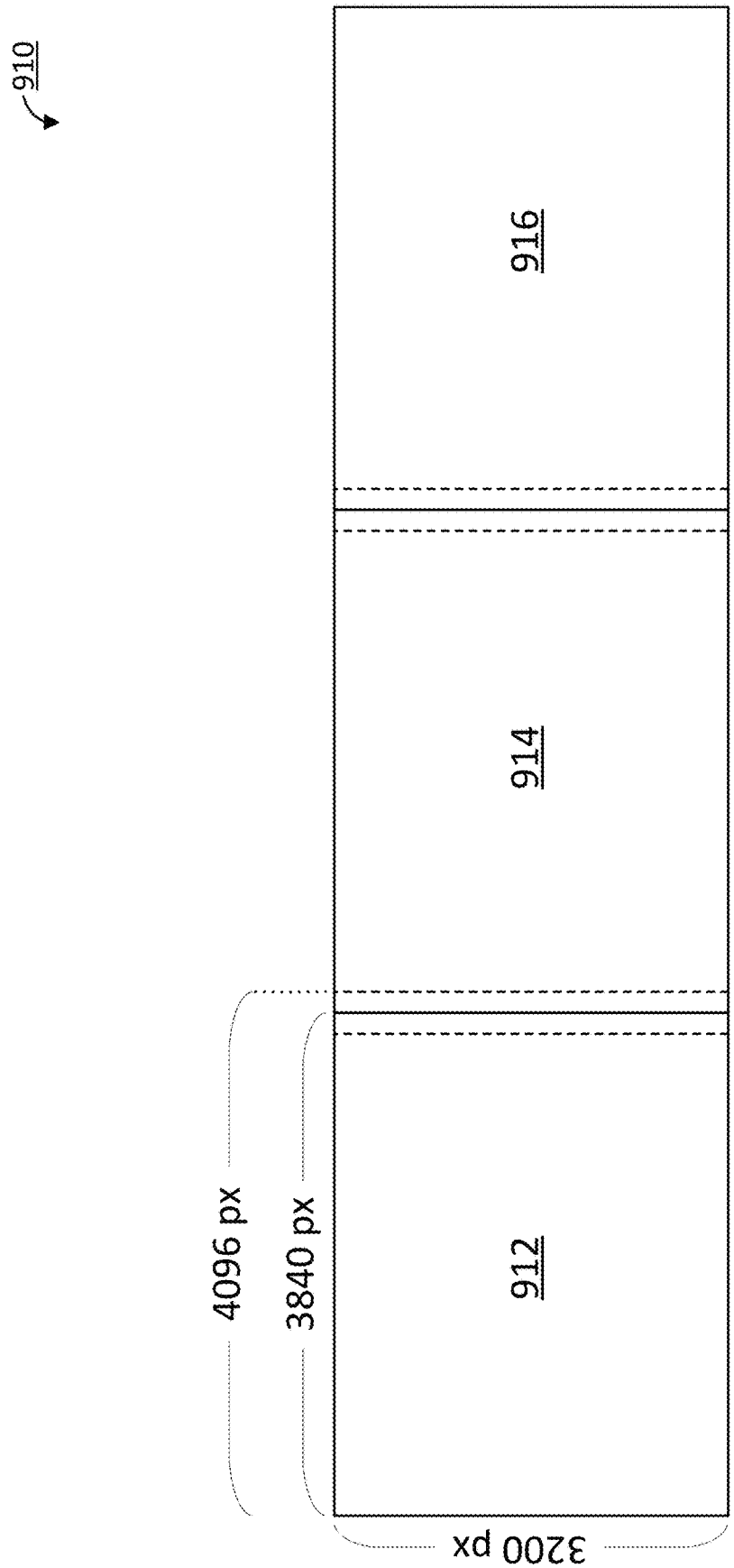

FIG. 9B illustrates another example application of the spatially lapped segmentation described herein for encoding a widescreen video frame, according to some embodiments. In some embodiments, a super ultrawide video frame 910 may be constructed using three frame regions. For example, the encoding approach described with respect to FIG. 5A may be used in this case with three encoders to generate three encoded 4096×3200 frame regions, which can be lapped horizontally twice, between a frame regions 912 and 914 and between frame regions 914 and 916, as shown.

Figure 10:
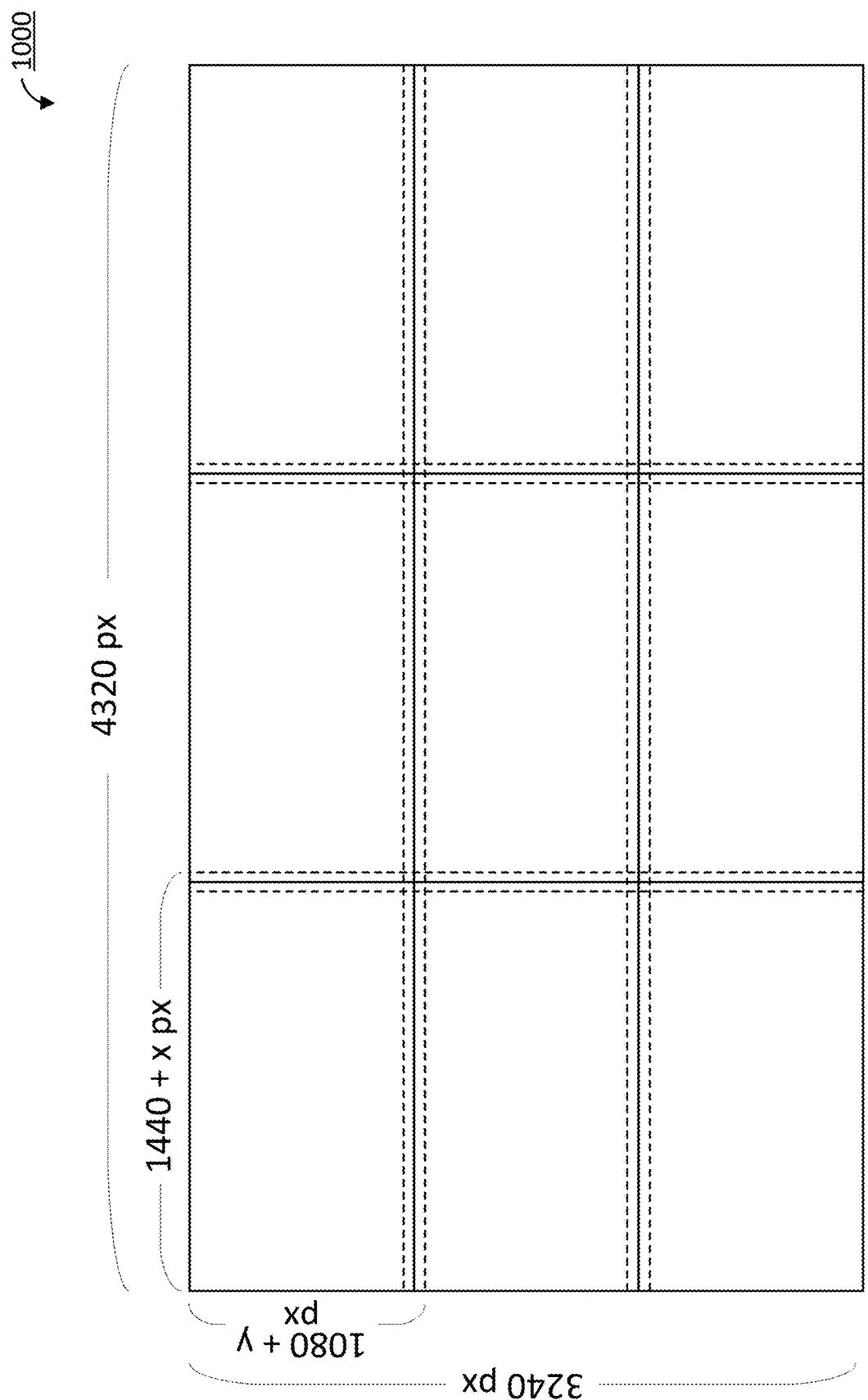
FIG. 10 illustrates another example application of the spatially lapped segmentation described herein for encoding a video frame, according to some embodiments.

FIG. 10 illustrates another example application of the spatially lapped segmentation described herein for encoding a video frame 1000, according to some embodiments. In some embodiments, the video frame 1000 may be constructed using nine encoders to generate nine encoded frame regions arranged in a 3×3 grid. Horizontal and/or vertical lapping may be used, for example, using the encoding approach described with respect to FIG. 5B or 6B.

In some scenarios, such as that depicted in FIG. 10, the video frame may be a 4K video frame having a 4320×3240 resolution. In some implementations, the video frame 1000 may be an arrangement of nine encoded frame regions having a resolution of (1440+x) (1080+y). Depending on whether only one of horizontal or vertical lapping is used, x or y may equal 0, and either the height or the width of the encoded frame regions may surpass the standard resolution, e.g., 1440×1080, which is a 1080p format in a 4:3 aspect ratio.

The concepts described herein may be extended and applied to myriad other resolutions of frame regions to construct video frames having resolutions other than those specifically used above, which are purely for illustrative purposes.

Methods

Figure 11:
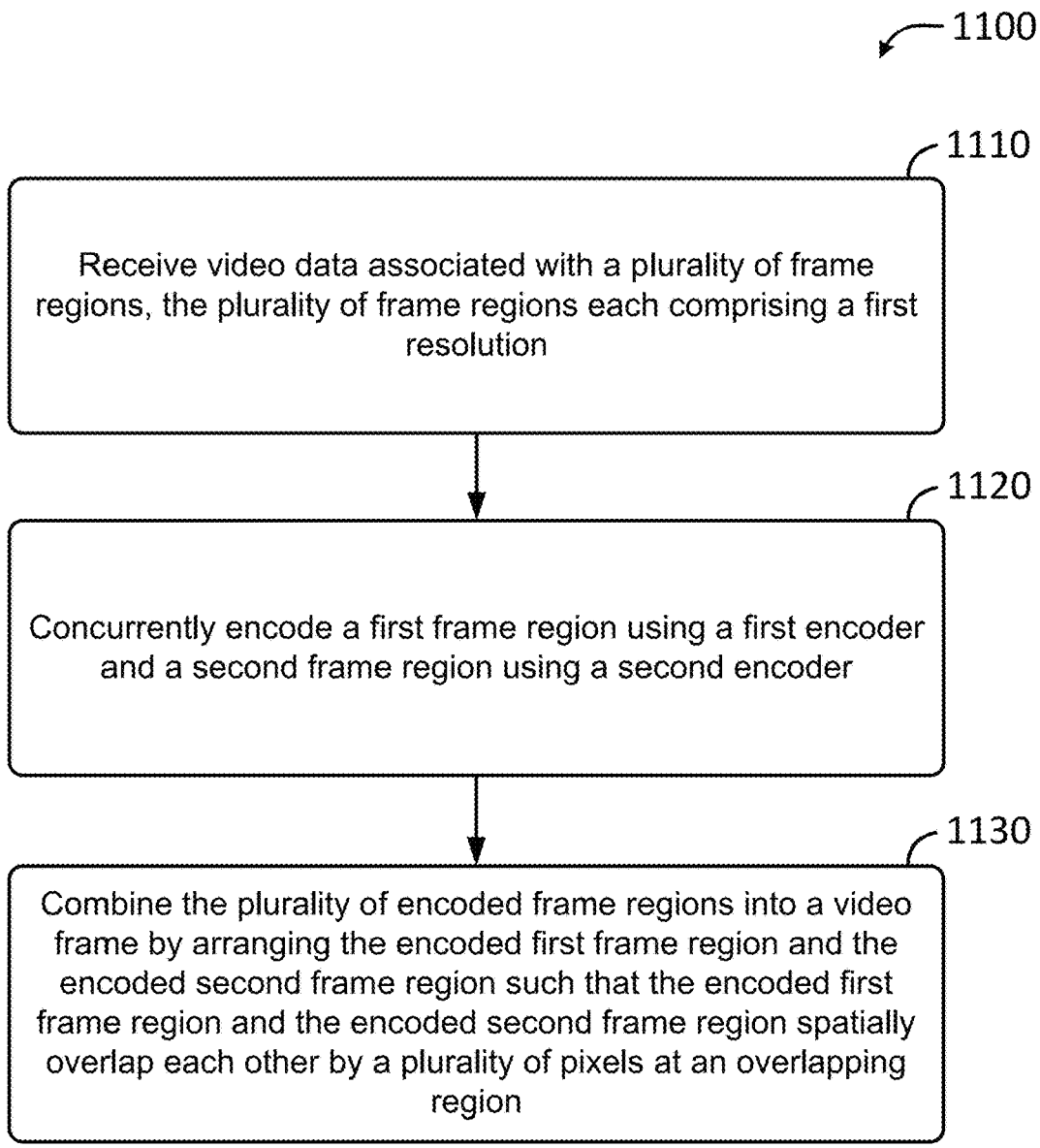
FIG. 11 illustrates a method of high-resolution video encoding, according to some embodiments.
Figure 13:
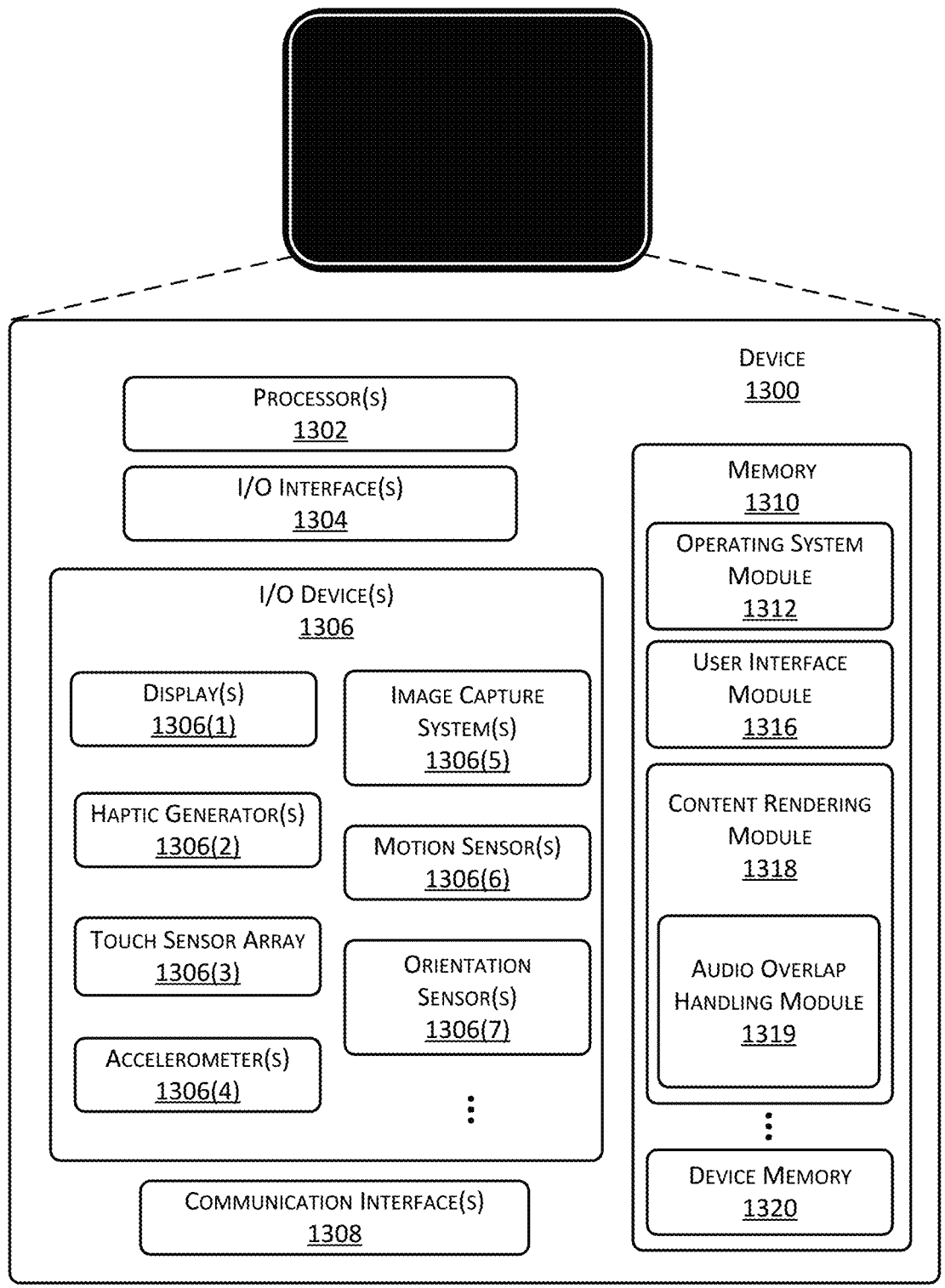
FIG. 13 is a block diagram of an example of a user device suitable for use with various embodiments discussed herein.

FIG. 11 illustrates a method 1100 of high-resolution video encoding, according to some embodiments. The functionality illustrated in one or more of the blocks shown in FIG. 11 may be performed by hardware (e.g., processor) and/or software components of a computerized apparatus such as a user device or a networked entity such as a server apparatus, or a computer-readable apparatus including a storage medium storing computer-readable and/or computer-executable instructions that are configured to, when executed by a processor apparatus, cause the at least one processor apparatus or the computerized apparatus to perform the operations. Example components of the computerized apparatus or networked entity are illustrated in FIG. 13, which are described in more detail below.

It should also be noted that the operations of the method 1100 may be performed in any suitable order, not necessarily the order depicted in FIG. 11. It should also be noted that the method 1100 may include additional or fewer operations than those depicted in FIG. 11 to perform the encoding.

At block 1110, the method 1100 may include receiving video data associated with a plurality of frame regions, the plurality of frame regions each comprising a first resolution. In some embodiments, the first resolution may be a resolution exceeding a standard resolution for a 1080p or 4K video resolution. For example, the first resolution may be at least 4096×2160 (greater than the standard 4K resolution of 3840×2160) or 1920×1088 (greater than the standard 1080p resolution of 1920×1080).

At block 1120, the method 1100 may include concurrently encoding a first frame region using a first encoder and a second frame region using a second encoder. In some embodiments, the parallel image processing approach as described with FIG. 8A may be performed to encode the first frame region and the second frame region concurrently.

At block 1130, the method 1100 may include combining the plurality of encoded frame regions into a video frame by arranging the encoded first frame region and the encoded second frame region such that the encoded first frame region and the encoded second frame region spatially overlap each other by a plurality of pixels at an overlapping region. In some embodiments, the combined video frame may have a second resolution larger than the first resolution but less than a sum of the first resolution of each of the plurality of frame regions. The spatial overlap may allow the encoded frame regions to fit within the resolution of the video frame, according to the spatial lapped encoding described with respect to FIGS. 5A-6B. For example, the arrangement may include horizontal and/or vertical lapping in order to construct a video frame that has a standard video display resolution, e.g., 3840×2160 4K or 7680×4320 8K.

In some embodiments, visual discontinuities may be minimized by accounting for encoding parameters of the overlapping region to encode a portion of the first frame region. The first encoder may be configured to encode a portion of the first frame region based on a quantization parameter (QP) used by the second encoder to encode the second frame region at the overlapping region.

Figure 12:
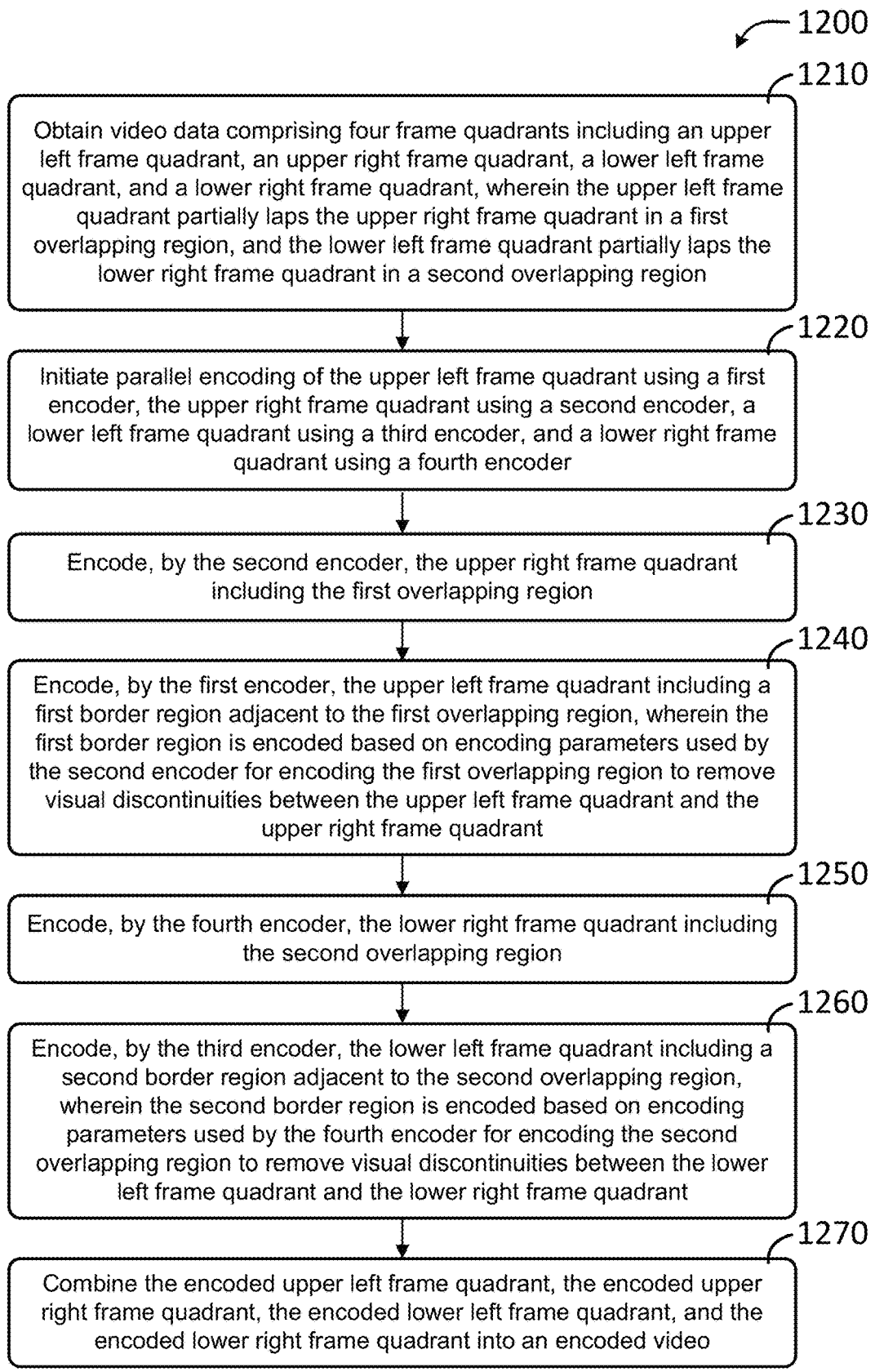
FIG. 12 illustrates a method of high-resolution video encoding, according to some embodiments.

FIG. 12 illustrates a method 1200 of high-resolution video encoding, according to some embodiments. The functionality illustrated in one or more of the blocks shown in FIG. 12 may be performed by hardware (e.g., processor) and/or software components of a computerized apparatus such as a user device or a networked entity such as a server apparatus, or a computer-readable apparatus including a storage medium storing computer-readable and/or computer-executable instructions that are configured to, when executed by a processor apparatus, cause the at least one processor apparatus or the computerized apparatus to perform the operations. Example components of the computerized apparatus or networked entity are illustrated in FIG. 13, which are described in more detail below.

It should also be noted that the operations of the method 1200 may be performed in any suitable order, not necessarily the order depicted in FIG. 12. It should also be noted that the method 1200 may include additional or fewer operations than those depicted in FIG. 12 to perform the encoding.

At block 1210, the method 1200 may include obtaining video data associated with four frame quadrants, the four frame quadrants including an upper left frame quadrant, an upper right frame quadrant, a lower left frame quadrant, and a lower right frame quadrant, wherein the upper left frame quadrant partially laps the upper right frame quadrant in a first overlapping region, and the lower left frame quadrant partially laps the lower right frame quadrant in a second overlapping region. The video data may be examples of video data corresponding input frames 404a-404d of FIG. 4. The four frame quadrants may be examples of the frame regions 502, 504, 506, 508 as described with respect to FIG. 5A.

According to various implementations, the frame quadrants may have a resolution that is greater than the standard encoding resolution. For example, the frame quadrants may be 4096×2160, which is wider than the standard 4K resolution of 3840×2160. As another example, the frame quadrants may be 1920×1088, which is taller than the standard 1080p resolution of 1920×1080. Since the frame quadrants are larger than they can be arranged adjacently without any overlap, the frame quadrants are lapped horizontally and/or vertically. Myriad spatially lapping arrangements may be possible, as shown by FIGS. 5A-10.

In some embodiments, the first and second overlapping regions correspond to an overlapping region caused by horizontal lapping, such as the overlapping region 510 or 810 depicted in FIGS. 5A and 8A. In some embodiments, the first and second overlapping regions correspond to an overlapping region caused by vertical lapping, such as the overlapping region 560, 610 or 820 depicted in FIGS. 5B, 6A and 8B. In some embodiments, both horizontal and vertical lapping may occur.

At block 1220, the method 1200 may include initiating parallel encoding of the upper left frame quadrant using a first encoder, the upper right frame quadrant using a second encoder, a lower left frame quadrant using a third encoder, and a lower right frame quadrant using a fourth encoder. The first, second, third, and fourth encoders may be examples of the encoders 406a-406d of FIG. 4. The encoders may be configured to encode video data into resolutions that are greater than the standard resolutions noted above. In some embodiments, the encoders may concurrently encode respective portions of the obtained video data associated with the four frame quadrants. The initiated parallel encoding may be an example of the parallel image processing shown in FIGS. 8A and 8B.

At block 1230, the method 1200 may include encoding, by the second encoder, the upper right frame quadrant including the first overlapping region. In some embodiments, the encoding by the second encoder may begin at the upper leftmost corner of the upper right frame quadrant, e.g., at the pixel block 822 as shown in FIG. 8A. The encoding by the second encoder may end at the lower rightmost corner of the upper right frame quadrant.

At block 1240, the method 1200 may include encoding, by the first encoder, the upper left frame quadrant including a first border region adjacent to the first overlapping region, wherein the first border region is encoded based at least on an encoding parameter used by the second encoder for encoding the first overlapping region to remove visual discontinuities between the upper left frame quadrant and the upper right frame quadrant. In some embodiments, the first border region includes a pixel block adjacent to a leftmost pixel block of upper right frame quadrant. The first border region may be as wide as this pixel block. The pixel block 824 shown in FIG. 8A is an example of a pixel block of the first border region being encoded. In some implementations, the encoding parameter used by the second encoder may be a quantization parameter (QP) of the pixel block 822, which the first encoder may reference to encode the pixel block of the first border region adjacent to the first overlapping region. In some cases, the QP may be within a prescribed range (e.g., 2 QP steps) of the encoding parameter used by the second encoder for encoding a pixel block in the first overlapping region. In some implementations, the QP may be the same in value as the encoding parameter used by the second encoder. Since the QPs of the adjacent pixel blocks where a visual discontinuity might occur are similar in value, this may remove visual discontinuities between the upper left frame quadrant and the upper right frame quadrant.

At block 1250, the method 1200 may include encoding, by the fourth encoder, the lower right frame quadrant including the second overlapping region. Similar to the encoding by the second encoder at block 1230, the encoding by the second encoder may begin at the upper leftmost corner of the lower right frame quadrant.

At block 1260, the method 1200 may include encoding, by the third encoder, the lower left frame quadrant including a second border region adjacent to the second overlapping region, wherein the second border region is encoded based at least on an encoding parameter used by the fourth encoder for encoding the second overlapping region to remove visual discontinuities between the lower left frame quadrant and the lower right frame quadrant. In some embodiments, the second border region includes a pixel block adjacent to a leftmost pixel block of lower right frame quadrant. The second border region may be as wide as this pixel block. In some implementations, the encoding parameter used by the fourth encoder may be a QP of a pixel block within the second overlapping region, which the third encoder may reference to encode a pixel block of the second border region adjacent to the second overlapping region.

At block 1270, the method 1200 may include combining the encoded upper left frame quadrant, the encoded upper right frame quadrant, the encoded lower left frame quadrant, and the encoded lower right frame quadrant into an encoded video frame. In some embodiments, the encoded video frame may be an arrangement of the frame quadrants into a 2×2 grid, e.g., the video frame illustrated in FIG. 5A. The arrangement may include spatial lapping in order to construct a video frame that has a standard video display resolution, e.g., 3840×2160 4K or 7680×4320 8K. In some specific cases, the encoded video frame has a resolution of 7680×4320 pixels, and the four frame quadrants have a resolution of at least 4096×2160 pixels. Various video frame resolutions are possible, as depicted in FIGS. 5A-10.

In some embodiments, combining the encoded frame quadrants may include discarding the first overlapping region encoded by the first encoder, and the second overlapping region encoded by the third encoder. Since the lapping results in redundant encoding, some encoded portions are discarded and not used in the resulting encoded video frame. The encoding at the overlapping regions performed by the second and fourth encoders are referenced by the first and third encoders, e.g., to determine encoding parameters at the first and second border regions, the encoding done by the first and third encoders may be discarded. However, in some embodiments, encoding contributions may be kept in different proportions, as discussed elsewhere herein.

In some embodiments, as noted above, additional lapping may be performed, with both horizontal and vertical lapping. In such cases, the upper left frame quadrant may partially lap the lower left frame quadrant in a third overlapping region, and the upper right frame quadrant may partially lap the lower right frame quadrant in a fourth overlapping region. In some implementations, the upper left frame quadrant encoded by the first encoder may include a third border region adjacent to the third overlapping region, the third border region being encoded based at least on an encoding parameter used by the third encoder for encoding the third overlapping region to remove visual discontinuities between the upper left frame quadrant and the lower left frame quadrant, and the upper right frame quadrant encoded by the second encoder may include a fourth border region adjacent to the fourth overlapping region, the fourth border region being encoded based at least on an encoding parameter used by the fourth encoder for encoding the fourth overlapping region to remove visual discontinuities between the upper right frame quadrant and the lower right frame quadrant.

Apparatus

FIG. 13 is a block diagram of an example of a user device 1300 suitable for use with various embodiments discussed above. As alluded to above, it should be understood that user device 1300 may be any of a wide variety of device types. In some embodiments, user device 1300 (depicted as a tablet device) may include one or more single or multi-core processors 1302 configured to execute stored instructions (e.g., in device memory 1320). User device 1300 may also include one or more input/output (I/O) interface(s) 1304 to allow the device to communicate with other devices. I/O interfaces 1304 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 1304 may be coupled to one or more I/O devices 1306 which may or may not be integrated with client device 1300.

User device 1300 may also include one or more communication interfaces 1308 configured to provide communications between the device and other devices. Such communication interface(s) 1308 may be used to connect to cellular networks, personal area networks (PANs), local area networks (LANs), wide area networks (WANs), and so forth. For example, communications interfaces 1308 may include radio frequency modules for a 3G, 4G, or 5G cellular network, a WiFi LAN and a Bluetooth PAN. User device 1300 may also include one or more buses or other internal communications hardware or software (not shown) that allow for the transfer of data and instructions between the various modules and components of the device.

User device 1300 may also include one or more memories (e.g., memory 1310). Memory 1310 may include non-transitory computer-readable storage media that may be any of a wide variety of types of volatile and non-volatile storage media including, for example, electronic storage media, magnetic storage media, optical storage media, quantum storage media, mechanical storage media, and so forth. Memory 1310 may provide storage for computer readable instructions, data structures, program modules and other data for the operation of user device 1300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 1310 may include at least one operating system (OS) module 1312 configured to manage hardware resources such as I/O interfaces 1304 and provide various services to applications or modules executing on processor(s) 1302. Memory 1310 may also include a user interface module 1316, a content rendering module 1318, and other modules. Memory 1310 may also include device memory 1320 to store a wide variety of instructions and information using any of a variety of formats including, for example, flat files, databases, linked lists, trees, or other data structures. Such information includes content for rendering and display on display 1306(1) including, for example, any type of video content.

In some embodiments, display 1306(1) may be a screen configured to multiple independent interfaces or video players, as illustrated in FIGS. 4A and 4B. In some embodiments, display 1306(1) may include one or more external screens, for example, a first screen and a second screen configured to display primary content and secondary content.

In some embodiments, a portion of device memory 1320 may be distributed across one or more other devices including servers, network attached storage devices, and so forth.

The logic used to handle overlaps between the audio components of successive periods of content (represented by 1319 in FIG. 13) may be implemented in a variety of ways, e.g., in hardware, software, and/or firmware. It will also be understood that user device 1300 of FIG. 13 is merely an example of a device with which various implementations enabled by the present disclosure may be practiced, and that a wide variety of other devices types may also be used. The scope of this disclosure should therefore not be limited by reference to device-specific details.

Figure 14:
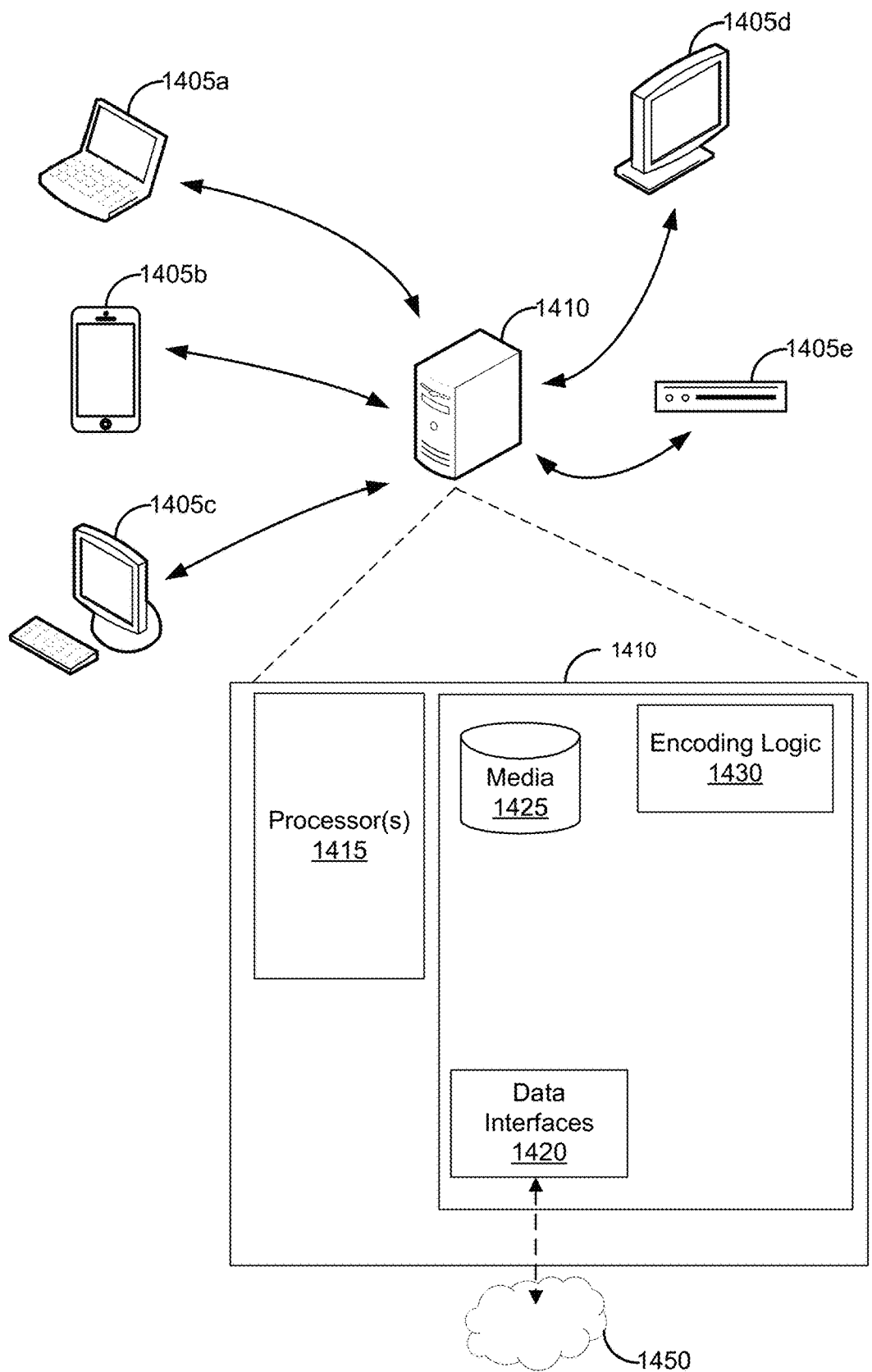
FIG. 14 is a block diagram of an example computing environment in which video data may be encoded into frame regions as enabled by the present disclosure.

FIG. 14 illustrates an example of a computing environment in which video data may be encoded into frame regions as enabled by the present disclosure. The computing environment of FIG. 14 includes a networked apparatus (e.g., server 1410) which can be used to perform encoding on obtained video data, and provide encoded video data to computerized devices 1405$a$-$e$ (e.g., user devices, display devices).

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media presentations herein is merely by way of example. Suitable alternatives known to those of skill in the art may be employed.

Server 1410 may be part of a content delivery system that conforms to any of a wide variety of architectures. The functionality and components of media server 1410 can use one or more servers and be deployed at one or more geographic locations (e.g., across different countries, states, cities, etc.) using a network 1450 such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc.

Server 1410 can include one or more data interfaces 1420 configured to perform data communication with the network 1450, e.g., to receive video data from a video source (e.g., 420), transmit live content (e.g., livestream content), or transmit encoded video data (e.g., 407). Server 1410 can include various types of logic used to provide media presentations for playback at devices 1405*a-e*. In FIG. 14, server 1410 includes storage 1425 and can include one or more processors 1415, memory, and other hardware for performing the tasks and logic disclosed herein. The storage 1425 may store computer-readable and computer-executable instructions configured to, when executed by the one or more processors 1415, cause the server 1410 to perform operations as described herein (e.g., methodologies of FIG. 11 or 12). Storage 1425 may also store a variety of media content (e.g., VOD content) for playback on devices 1405*a-e*, such as episodes of television shows, movies, music, etc. Storage 1425 can be a storage mechanism, such as a database. Server 1410 also includes encoding logic 1430. In some embodiments, the encoding logic 1430 may be configured to perform operations as described above. Spatially lapped encoding, parallel image processing, and methodologies 1100 and 1200 are examples of operations that may be performed or caused by the encoding logic 1430.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computerized method of high-resolution video encoding, the computerized method comprising:
   obtaining video data associated with four frame quadrants, the four frame quadrants including an upper left frame quadrant, an upper right frame quadrant, a lower left frame quadrant, and a lower right frame quadrant, wherein the upper left frame quadrant partially laps the upper right frame quadrant in a first overlapping region, the lower left frame quadrant partially laps the lower right frame quadrant in a second overlapping region, the upper left frame quadrant partially laps the lower left frame quadrant in a third overlapping region, and the upper right frame quadrant partially laps the lower right frame quadrant in a fourth overlapping region;
   initiating parallel encoding of the upper left frame quadrant using a first encoder, the upper right frame quadrant using a second encoder, a lower left frame quadrant using a third encoder, and a lower right frame quadrant using a fourth encoder;
   encoding, by the second encoder, the upper right frame quadrant including the first overlapping region between the upper left frame quadrant and the upper right frame quadrant;
   encoding, by the first encoder, the upper left frame quadrant including a first border region adjacent to the first overlapping region, wherein the first border region is encoded based at least on an encoding parameter used by the second encoder for encoding the first overlapping region to remove visual discontinuities between the upper left frame quadrant and the upper right frame quadrant;
   encoding, by the fourth encoder, the lower right frame quadrant including the second overlapping region between the lower left frame quadrant and the lower right frame quadrant;
   encoding, by the third encoder, the lower left frame quadrant including a second border region adjacent to the second overlapping region, wherein the second border region is encoded based at least on an encoding parameter used by the fourth encoder for encoding the second overlapping region to remove visual discontinuities between the lower left frame quadrant and the lower right frame quadrant; and
   combining the encoded upper left frame quadrant, the encoded upper right frame quadrant, the encoded lower left frame quadrant, and the encoded lower right frame quadrant into an encoded video frame.

2. The computerized method of claim 1,
   wherein the upper left frame quadrant encoded by the first encoder includes a third border region adjacent to the third overlapping region, the third border region being encoded based at least on an encoding parameter used by the third encoder for encoding the third overlapping region to remove visual discontinuities between the upper left frame quadrant and the lower left frame quadrant; and
   wherein the upper right frame quadrant encoded by the second encoder includes a fourth border region adjacent to the fourth overlapping region, the fourth border region being encoded based at least on an encoding parameter used by the fourth encoder for encoding the fourth overlapping region to remove visual discontinuities between the upper right frame quadrant and the lower right frame quadrant.

3. The computerized method of claim 1, wherein the encoded video frame has a resolution of 7680×4320 pixels, and each of the four frame quadrants has a resolution of at least 4096×2160 pixels.

4. The computerized method of claim 1, wherein the combining the encoded upper left frame quadrant, the encoded upper right frame quadrant, the encoded lower left frame quadrant, and the encoded lower right frame quadrant into the encoded video includes discarding the first overlapping region encoded by the first encoder, and the second overlapping region encoded by the third encoder.

5. A computerized system comprising:
a plurality of encoders configured to generate encoded video data of a video, the plurality of encoders comprising:
a first encoder configured to encode a first frame region of a video frame that spatially overlaps with a second frame region of the video frame at an overlapping region between the first frame region and the second frame region, and spatially overlaps with a third frame region of the video frame at an overlapping region between the first frame region and the third frame region;
a second encoder configured to encode the second frame region that spatially overlaps with the first frame region and a fourth frame region of the video frame at an overlapping region between the second frame region and the fourth frame region;
a third encoder configured to encode the third frame region of the video frame that spatially overlaps with the first frame region and the fourth frame region; and
a fourth encoder configured to encode the fourth frame region of the video frame that spatially overlaps with the second frame region and the third frame region;
wherein the first frame region includes a first border region adjacent to the overlapping region between the first frame region and the second frame region, in which the first frame region overlaps the second frame region within the overlapping region; and
wherein the first encoder is configured to encode the first border region based on an encoding parameter used by the second encoder to encode the overlapping region between the first frame region and the second frame region.

6. The computerized system of claim 5, wherein:
the encoding parameter includes one or more of a quantization value, pixel block partition information, transform skip mode information, motion vector data, or lookahead rate control information used by the second encoder.

7. The computerized system of claim 5, wherein the first and second encoders are configured to encode the first and second frame regions using wavefront parallel processing.

8. The computerized system of claim 5, wherein the overlapping region encoded by the first encoder is discarded from the encoded video data.

9. The computerized system of claim 5, wherein:
the video frame comprises a 2×2 grid having the first, second, third, and fourth frame regions each having a first resolution; and
the video frame comprises a second resolution larger than the first resolution but less than a sum of the first resolution of each of the first, second, third, and fourth frame regions.

10. The computerized system of claim 9, wherein the overlapping region between the first frame region and the second frame region comprises an overlap of at least 512 pixels between the first frame region and the second frame region.

11. The computerized system of claim 9, wherein the first resolution comprises at least 4096×2160 pixels, and the second resolution comprises at least 7680×4320 pixels.

12. The computerized system of claim 5, wherein the video frame comprises a row of at least the first and second frame regions, each of the first and second frame regions having a width of at least 4096 pixels and a height of at least 3200 pixels.

13. A non-transitory computer-readable apparatus comprising a storage medium, the storage medium comprising a plurality of computer-executable instructions configured to, when executed by one or more processors, cause a computerized apparatus to:
receive video data associated with a plurality of frame regions, the plurality of frame regions each comprising a first resolution, the plurality of frame regions comprising a first frame region and a second frame region;
concurrently encode (i) the first frame region, a first overlapping region that overlaps with the second frame region, and a first border region adjacent to the first overlapping region using a first encoder, and (ii) the second frame region, the first overlapping region, and a second border region adjacent to the first overlapping region using a second encoder; and
combine at least the encoded first and second frame regions into a video frame by arranging the encoded first frame region and the encoded second frame region such that the encoded first frame region and the encoded second frame region spatially overlap each other by a plurality of pixels at the first overlapping region;
wherein the first encoder is configured to encode a portion of the first frame region based on an encoding parameter used by the second encoder to encode the second frame region at the first overlapping region; and
wherein the combined video frame comprises a second resolution larger than the first resolution but less than a sum of the first resolution of each of the plurality of frame regions.

14. The non-transitory computer-readable apparatus of claim 13, wherein:
the encoding parameter comprises a quantization parameter; and
the first encoder is configured to determine a first quantization parameter to encode the portion of the first frame region based on a second quantization parameter used by the second encoder to encode the second frame region at the overlapping region.

15. The non-transitory computer-readable apparatus of claim 14, wherein the first quantization parameter is within a prescribed range relative to the second quantization parameter.

16. The non-transitory computer-readable apparatus of claim 13, wherein the first and second encoders are configured to encode the first and second frame regions using parallel image processing.

17. The non-transitory computer-readable apparatus of claim 13, wherein the arrangement of the encoded first frame region and the encoded second frame region comprises a discard of the overlapping region encoded by the first encoder from the combined video frame.

18. The non-transitory computer-readable apparatus of claim 13, wherein the plurality of computer-executable instructions are further configured to, when executed by the one or more processors, cause the computerized apparatus to: concurrently encode a third frame region using a third encoder and a fourth frame region using a fourth encoder;
wherein the combination of the plurality of encoded frame regions into the video frame comprises an arrangement of the encoded third frame region and the encoded fourth frame region such that the encoded third frame region and the encoded fourth frame region spatially overlap each other by a plurality of pixels at a second overlapping region, and the first, second, third, and fourth frame regions are in a 2×2 grid.

19. The non-transitory computer-readable apparatus of claim 17, wherein the first frame region and the third frame region spatially overlap at a third overlapping region, and the second frame region and the fourth frame region spatially overlap at a fourth overlapping region.

20. The non-transitory computer-readable apparatus of claim 17, wherein the first resolution comprises at least 4096×2160 pixels, and the second resolution comprises at least 7680×4320 pixels.

\* \* \* \* \*